(12) United States Patent
Takeshita

(10) Patent No.: US 8,429,053 B2
(45) Date of Patent: Apr. 23, 2013

(54) INFORMATION PROCESSING APPARATUS, INFORMATION PROCESSING METHOD AND PROGRAM PRODUCT FOR FAST COMPUTATION OF RISK MEASURES AND RISK CONTRIBUTIONS

(75) Inventor: Hiroki Takeshita, Tokyo (JP)

(73) Assignee: NS Solutions Corporation, Tokyo (JP)

( * ) Notice: Subject to any disclaimer, the term of this patent is extended or adjusted under 35 U.S.C. 154(b) by 407 days.

(21) Appl. No.: 12/788,558

(22) Filed: May 27, 2010

(65) Prior Publication Data

US 2010/0306131 A1    Dec. 2, 2010
US 2011/0276453 A2    Nov. 10, 2011

(30) Foreign Application Priority Data

May 29, 2009 (JP) .................................. 2009-131204
Apr. 16, 2010 (JP) .................................. 2010-095350

(51) Int. Cl.
    *G06Q 40/00*      (2012.01)

(52) U.S. Cl.
    USPC ...................................................... 705/36 R

(58) Field of Classification Search .................. 705/36 R
See application file for complete search history.

(56) References Cited

U.S. PATENT DOCUMENTS

| | | | | |
|---|---|---|---|---|
| 7,526,446 | B2 * | 4/2009 | Aguais et al. ................... | 705/38 |
| 7,627,511 | B2 | 12/2009 | Takano et al. | |
| 2003/0135448 | A1 * | 7/2003 | Aguias et al. ................... | 705/38 |
| 2003/0135450 | A1 * | 7/2003 | Aguais et al. ................... | 705/38 |
| 2009/0006275 | A1 | 1/2009 | Takano et al. | |

FOREIGN PATENT DOCUMENTS

JP     2009-32237 A    2/2009

OTHER PUBLICATIONS

"Analytical Evaluation Method for Credit Risk of Credit Portfolio Centered on Limiting Loss Distribution and Granularity Adjustment", Jul. 2005.
G.M. Gupton, et al, CreditMetrics™—Technical Document, Apr. 2, 1997, J.P. Morgan & Co. Incorporated.
Eva Lütkebohmert, "Granularity Adjustment For The Basel II-Model", Deutsche Bundesbank, Mar. 1, 2006.
"Multi-Factor Adjustment", Portfolio Credit Risk/Cutting Edge, Mar. 2004, pp. 85-90, www.Risk.Net.
C. Gourieroux et al., "Sensitivity Analysis of Values At Risk", Jun. 1999.
R. Martin et al., "Taking To The Saddle", Credit Portfolio Modeling, Jun. 2001, www.Risk.Net.

* cited by examiner

*Primary Examiner* — Eric T Wong

(74) *Attorney, Agent, or Firm* — Arent Fox LLP

(57) ABSTRACT

An information processing apparatus includes: a rating threshold calculating unit obtaining a probability $p_{sk}$ of transition from a rating s to a rating k stored in the storage device, and calculating a rating threshold $\theta_{ir}$ at which the rating of a obligor i becomes a rating r or lower based on the obtained $p_{sk}$, a conditional probability calculating unit obtaining a constant $a_i$ of each obligor i stored in the storage device, and calculating a probability $ps_{ir}(z)$ that the rating of the obligor i becomes the rating r or lower under a condition that z is fixed based on the obtained $a_i$, z calculated in the z calculating unit, and the $\theta_{ir}$ calculated in the rating threshold calculating unit, and a $w_{ir}$ calculating unit calculating a difference $w_{ir}$ in exposure value between adjacent ratings of the obligor i based on an exposure value $V_{ir}$ of the obligor i when transition from a current rating to the rating r occurs, which is stored in the storage device.

7 Claims, 16 Drawing Sheets

FIG.8

| | | RATING r | | | | | | | | | (%) |
|---|---|---|---|---|---|---|---|---|---|---|---|
| | | AAA | AA | A | BBB | BB | B | CCC | CC | C | DEFAULT | TOTAL |
| CURRENT RATING | AAA | 60 | 20 | 10 | 5 | 3 | 1 | 0.9 | 0.06 | 0.03 | 0.01 | 100 |
| | AA | 10 | 60 | 10 | 7 | 5 | 4 | 3 | 0.85 | 0.1 | 0.05 | 100 |
| | A | 5 | 10 | 60 | 10 | 7 | 5 | 2 | 0.6 | 0.3 | 0.1 | 100 |
| | BBB | 3 | 5 | 10 | 60 | 10 | 5 | 3 | 2.5 | 1 | 0.5 | 100 |
| | BB | 2 | 3 | 5 | 10 | 60 | 10 | 5 | 3 | 1.3 | 0.7 | 100 |
| | B | 1 | 2 | 4 | 5 | 10 | 60 | 10 | 5 | 2 | 1 | 100 |
| | CCC | ... | ... | ... | ... | ... | ... | ... | ... | ... | ... | 100 |
| | CC | ... | ... | ... | ... | ... | ... | ... | ... | ... | ... | 100 |
| | C | ... | ... | ... | ... | ... | ... | ... | ... | ... | ... | 100 |
| | DEFAULT | 0 | 0 | 0 | 0 | 0 | 0 | 0 | 0 | 0 | 100 | 100 |

FIG.9

| | | RATING r | | | | | | | | | |
|---|---|---|---|---|---|---|---|---|---|---|---|
| | | AAA | AA | A | BBB | BB | B | CCC | CC | C | DEFAULT |
| CURRENT RATING | AAA | 100 | 40 | 20 | 10 | 5 | 2 | 1 | 0.1 | 0.04 | 0.01 |
| | AA | 100 | 90 | 30 | 20 | 13 | 8 | 4 | 1 | 0.15 | 0.05 |
| | A | 100 | 95 | 85 | 25 | 15 | 8 | 3 | 1 | 0.4 | 0.1 |
| | BBB | 100 | 97 | 92 | 82 | 22 | 12 | 7 | 4 | 1.5 | 0.5 |
| | BB | 100 | 98 | 95 | 90 | 80 | 20 | 10 | 5 | 2 | 0.7 |
| | B | 100 | 99 | 97 | 93 | 88 | 78 | 18 | 8 | 3 | 1 |
| | CCC | ... | ... | ... | ... | ... | ... | ... | ... | ... | ... |
| | CC | ... | ... | ... | ... | ... | ... | ... | ... | ... | ... |
| | C | ... | ... | ... | ... | ... | ... | ... | ... | ... | ... |
| | DEFAULT | 100 | 0 | 0 | 0 | 0 | 0 | 0 | 0 | 0 | 100 |

FIG.10

| FROM FIG.16 | | RATING AFTER TRNSITION | | | | | | | | |
|---|---|---|---|---|---|---|---|---|---|---|
| | | AAA | AA | A | BBB | BB | B | CCC | CC | C | DEFAULT |
| OBLIGOR 1 | A | 100 | 95 | 85 | 25 | 15 | 8 | 3 | 1 | 0.4 | 0.1 |
| OBLIGOR 2 | AA | 100 | 90 | 30 | 20 | 13 | 8 | 4 | 1 | 0.15 | 0.05 |
| OBLIGOR 3 | BBB | 100 | 97 | 92 | 82 | 22 | 12 | 7 | 4 | 1.5 | 0.5 |
| OBLIGOR 4 | BB | 100 | 98 | 95 | 90 | 80 | 20 | 10 | 5 | 2 | 0.7 |
| OBLIGOR 5 | AAA | 100 | 40 | 20 | 10 | 5 | 2 | 1 | 0.1 | 0.04 | 0.01 |
| OBLIGOR 6 | A | 100 | 95 | 85 | 25 | 15 | 8 | 3 | 1 | 0.4 | 0.1 |
| OBLIGOR 7 | A | 100 | 95 | 85 | 25 | 15 | 8 | 3 | 1 | 0.4 | 0.1 |
| OBLIGOR 8 | B | 100 | 99 | 97 | 93 | 88 | 78 | 18 | 8 | 3 | 1 |
| OBLIGOR 9 | B | 100 | 99 | 97 | 93 | 88 | 78 | 18 | 8 | 3 | 1 |
| OBLIGOR 10 | CC | ... | ... | ... | ... | ... | ... | ... | ... | ... | ... |
| ... | ... | ... | ... | ... | ... | ... | ... | ... | ... | ... | ... |
| ... | ... | ... | ... | ... | ... | ... | ... | ... | ... | ... | ... |
| ... | ... | ... | ... | ... | ... | ... | ... | ... | ... | ... | ... |
| OBLIGOR M | ... | ... | ... | ... | ... | ... | ... | ... | ... | ... | ... |

FIG.11

| | RATING r | | | | | | | | | |
|---|---|---|---|---|---|---|---|---|---|---|
| | AAA | AA | A | BBB | BB | B | CCC | CC | C | DEFAULT |
| OBLIGOR 1 | $\infty$ | 1.64 | 1.04 | -0.67 | -1.04 | -1.41 | -1.88 | -2.33 | -2.65 | -3.09 |
| OBLIGOR 2 | $\infty$ | 1.28 | -0.52 | -0.84 | -1.13 | -1.41 | -1.75 | -2.33 | -2.97 | -3.29 |
| OBLIGOR 3 | $\infty$ | 1.88 | 1.41 | 0.92 | -0.77 | -1.17 | -1.48 | -1.75 | -2.17 | -2.58 |
| OBLIGOR 4 | $\infty$ | 2.05 | 1.64 | 1.28 | 0.84 | -0.84 | -1.28 | -1.64 | -2.05 | -2.46 |
| OBLIGOR 5 | $\infty$ | -0.25 | -0.84 | -1.28 | -1.64 | -2.05 | -2.33 | -3.09 | -3.35 | -3.72 |
| OBLIGOR 6 | $\infty$ | 1.64 | 1.04 | -0.67 | -1.04 | -1.41 | -1.88 | -2.33 | -2.65 | -3.09 |
| OBLIGOR 7 | $\infty$ | 1.64 | 1.04 | -0.67 | -1.04 | -1.41 | -1.88 | -2.33 | -2.65 | -3.09 |
| OBLIGOR 8 | $\infty$ | 2.33 | 1.88 | 1.48 | 1.17 | 0.77 | -0.92 | -1.41 | -1.88 | -2.33 |
| OBLIGOR 9 | $\infty$ | 2.33 | 1.88 | 1.48 | 1.17 | 0.77 | -0.92 | -1.41 | -1.88 | -2.33 |
| OBLIGOR 10 | ... | ... | ... | ... | ... | ... | ... | ... | ... | ... |
| ... | ... | ... | ... | ... | ... | ... | ... | ... | ... | ... |
| ... | ... | ... | ... | ... | ... | ... | ... | ... | ... | ... |
| ... | ... | ... | ... | ... | ... | ... | ... | ... | ... | ... |
| OBLIGOR M | ... | ... | ... | ... | ... | ... | ... | ... | ... | ... |

FIG.12

|  | INDEX 1 | INDEX 2 | INDEX 3 | INDEX 4 | ... | INDEX M |
|---|---|---|---|---|---|---|
| INDEX 1 | 100% | 30% | 20% | 5% | ... | ... |
| INDEX 2 | 30% | 100% | 40% | 10% | ... | ... |
| INDEX 3 | 20% | 40% | 100% | 20% | ... | ... |
| INDEX 4 | 5% | 10% | 20% | 100% | ... | ... |
| ... | ... | ... | ... | ... | ... | ... |
| ... | ... | ... | ... | ... | ... | ... |
| ... | ... | ... | ... | ... | ... | ... |
| ... | ... | ... | ... | ... | ... | ... |
| ... | ... | ... | ... | ... | ... | ... |
| INDEX M | ... | ... | ... | ... | ... | 100% |

FIG.13

|  | INDEX NUMBER | | | WEIGHT | | |
|---|---|---|---|---|---|---|
|  | (1) | (2) | (3) | (1) | (2) | (3) |
| OBLIGOR 1 | 5 | – | – | 5% | – | – |
| OBLIGOR 2 | 1 | – | – | 10% | – | – |
| OBLIGOR 3 | 3 | – | – | 20% | – | – |
| OBLIGOR 4 | 7 | 8 | – | 5% | 10% | – |
| OBLIGOR 5 | 2 | – | – | 10% | – | – |
| OBLIGOR 6 | 1 | – | – | 15% | – | – |
| OBLIGOR 7 | 1 | – | – | 10% | – | – |
| OBLIGOR 8 | 3 | – | – | 20% | – | – |
| OBLIGOR 9 | 8 | 9 | 10 | 5% | 3% | 4% |
| OBLIGOR 10 | 4 | – | – | 30% | – | – |
| ... | ... | ... | ... | ... | ... | ... |
| ... | ... | ... | ... | ... | ... | ... |
| ... | ... | ... | ... | ... | ... | ... |
| OBLIGOR M | ... | ... | ... | ... | ... | ... |

FIG.14

| | RATING r | | | | | | | | | |
|---|---|---|---|---|---|---|---|---|---|---|
| | AAA | AA | A | BBB | BB | B | CCC | CC | C | DEFAULT |
| OBLIGOR 1 | 100% | 99% | 96% | 51% | 36% | 23% | 11% | 5% | 2.21% | 0.69% |
| OBLIGOR 2 | 100% | 98% | 57% | 44% | 33% | 23% | 14% | 5% | 0.97% | 0.38% |
| OBLIGOR 3 | 100% | 100% | 98% | 95% | 47% | 31% | 21% | 14% | 6.46% | 2.66% |
| OBLIGOR 4 | 100% | 100% | 99% | 98% | 94% | 44% | 27% | 16% | 8.10% | 3.50% |
| OBLIGOR 5 | 100% | 67% | 44% | 27% | 16% | 8% | 5% | 1% | 0.32% | 0.09% |
| OBLIGOR 6 | 100% | 99% | 96% | 51% | 36% | 23% | 11% | 5% | 2.21% | 0.69% |
| OBLIGOR 7 | 100% | 99% | 96% | 51% | 36% | 23% | 11% | 5% | 2.21% | 0.69% |
| OBLIGOR 8 | 100% | 100% | 100% | 99% | 97% | 93% | 41% | 23% | 11.11% | 4.67% |
| OBLIGOR 9 | 100% | 100% | 100% | 99% | 97% | 93% | 41% | 23% | 11.11% | 4.67% |
| OBLIGOR 10 | ... | ... | ... | ... | ... | ... | ... | ... | ... | ... |
| ... | ... | ... | ... | ... | ... | ... | ... | ... | ... | ... |
| ... | ... | ... | ... | ... | ... | ... | ... | ... | ... | ... |
| ... | ... | ... | ... | ... | ... | ... | ... | ... | ... | ... |
| OBLIGOR M | ... | ... | ... | ... | ... | ... | ... | ... | ... | ... |

FIG.15

| | RATING r | | | | | | | | | |
|---|---|---|---|---|---|---|---|---|---|---|
| | AAA | AA | A | BBB | BB | B | CCC | CC | C | DEFAULT |
| OBLIGOR 1 | | | | | | | | | | |
| OBLIGOR 2 | | | | | | | | | | |
| OBLIGOR 3 | | | | | | | | | | |
| OBLIGOR 4 | | | | | | | | | | |
| OBLIGOR 5 | | | | | | | | | | |
| OBLIGOR 6 | | | | | | | | | | |
| OBLIGOR 7 | | | | | | | | | | |
| OBLIGOR 8 | | | | | | | | | | |
| OBLIGOR 9 | | | | | | | | | | |
| OBLIGOR 10 | ... | ... | ... | ... | ... | ... | ... | ... | ... | ... |
| ... | ... | ... | ... | ... | ... | ... | ... | ... | ... | ... |
| ... | ... | ... | ... | ... | ... | ... | ... | ... | ... | ... |
| ... | ... | ... | ... | ... | ... | ... | ... | ... | ... | ... |
| OBLIGOR M | ... | ... | ... | ... | ... | ... | ... | ... | ... | ... |

FIG.16

| | RATING r | | | | | | | | | |
|---|---|---|---|---|---|---|---|---|---|---|
| | AAA | AA | A | BBB | BB | B | CCC | CC | C | DEFAULT |
| OBLIGOR 1 | | | | | | | | | | |
| OBLIGOR 2 | | | | | | | | | | |
| OBLIGOR 3 | | | | | | | | | | |
| OBLIGOR 4 | | | | | | | | | | |
| OBLIGOR 5 | | | | | | | | | | |
| OBLIGOR 6 | | | | | | | | | | |
| OBLIGOR 7 | | | | | | | | | | |
| OBLIGOR 8 | | | | | | | | | | |
| OBLIGOR 9 | | | | | | | | | | |
| OBLIGOR 10 | ... | ... | ... | ... | ... | ... | ... | ... | ... | ... |
| ... | ... | ... | ... | ... | ... | ... | ... | ... | ... | ... |
| ... | ... | ... | ... | ... | ... | ... | ... | ... | ... | ... |
| ... | ... | ... | ... | ... | ... | ... | ... | ... | ... | ... |
| OBLIGOR M | ... | ... | ... | ... | ... | ... | ... | ... | ... | ... |

FIG.17

| | CURRENT RATING | RATING r | | | | | | | | | |
|---|---|---|---|---|---|---|---|---|---|---|---|
| | | AAA | AA | A | BBB | BB | B | CCC | CC | C | DEFAULT |
| OBLIGOR 1 | A | 990 | 979 | 968 | 953 | 934 | 911 | 884 | 841 | 761 | 510 |
| OBLIGOR 2 | AA | 1,936 | 1,869 | 1,800 | 1,717 | 1,615 | 1,498 | 1,372 | 1,192 | 919 | 399 |
| OBLIGOR 3 | BBB | 394 | 388 | 381 | 372 | 361 | 348 | 333 | 310 | 268 | 154 |
| OBLIGOR 4 | BB | 4,524 | 4,053 | 3,595 | 3,094 | 2,533 | 1,973 | 1,461 | 886 | 326 | 6 |
| OBLIGOR 5 | AAA | 569 | 538 | 507 | 472 | 431 | 387 | 343 | 288 | 216 | 109 |
| OBLIGOR 6 | A | 761 | 721 | 680 | 633 | 576 | 513 | 449 | 363 | 244 | 70 |
| OBLIGOR 7 | A | 473 | 445 | 417 | 384 | 345 | 303 | 260 | 203 | 128 | 28 |
| OBLIGOR 8 | B | 750 | 699 | 647 | 589 | 520 | 447 | 374 | 282 | 167 | 37 |
| OBLIGOR 9 | B | 2,728 | 2,215 | 1,768 | 1,338 | 928 | 594 | 355 | 162 | 46 | 4 |
| OBLIGOR 10 | CC | ... | ... | ... | ... | ... | ... | ... | ... | ... | ... |
| ... | ... | ... | ... | ... | ... | ... | ... | ... | ... | ... | ... |
| ... | ... | ... | ... | ... | ... | ... | ... | ... | ... | ... | ... |
| ... | ... | ... | ... | ... | ... | ... | ... | ... | ... | ... | ... |
| OBLIGOR M | ... | ... | ... | ... | ... | ... | ... | ... | ... | ... | ... |

FIG.18

| | RATING r | | | | | | | | | |
|---|---|---|---|---|---|---|---|---|---|---|
| | AAA | AA | A | BBB | BB | B | CCC | CC | C | DEFAULT |
| OBLIGOR 1 | 990 | -11 | -12 | -14 | -19 | -23 | -27 | -43 | -80 | -251 |
| OBLIGOR 2 | 1,936 | -67 | -70 | -82 | -102 | -117 | -126 | -180 | -273 | -520 |
| OBLIGOR 3 | 394 | -6 | -7 | -8 | -11 | -13 | -15 | -24 | -42 | -114 |
| OBLIGOR 4 | 4,524 | -471 | -458 | -501 | -561 | -560 | -511 | -575 | -560 | -320 |
| OBLIGOR 5 | 569 | -31 | -31 | -35 | -41 | -44 | -43 | -56 | -72 | -107 |
| OBLIGOR 6 | 761 | -40 | -41 | -47 | -57 | -63 | -64 | -86 | -118 | -174 |
| OBLIGOR 7 | 473 | -28 | -28 | -32 | -39 | -42 | -43 | -57 | -75 | -100 |
| OBLIGOR 8 | 750 | -51 | -51 | -58 | -69 | -73 | -73 | -93 | -114 | -130 |
| OBLIGOR 9 | 2,728 | -513 | -447 | -430 | -410 | -334 | -239 | -194 | -115 | -43 |
| OBLIGOR 10 | ... | ... | ... | ... | ... | ... | ... | ... | ... | ... |
| ... | ... | ... | ... | ... | ... | ... | ... | ... | ... | ... |
| ... | ... | ... | ... | ... | ... | ... | ... | ... | ... | ... |
| ... | ... | ... | ... | ... | ... | ... | ... | ... | ... | ... |
| OBLIGOR M | ... | ... | ... | ... | ... | ... | ... | ... | ... | ... |

FIG.19

| | $l_i(z)$ | $l'_i(z)$ | $l''_i(z)$ | $v_i(z)$ | $v'_i(z)$ | $\Delta q_i(z)$ | $q_i(z)$ |
|---|---|---|---|---|---|---|---|
| OBLIGOR 1 | | | | | | | |
| OBLIGOR 2 | | | | | | | |
| OBLIGOR 3 | | | | | | | |
| OBLIGOR 4 | | | | | | | |
| OBLIGOR 5 | | | | | | | |
| OBLIGOR 6 | | | | | | | |
| OBLIGOR 7 | | | | | | | |
| OBLIGOR 8 | | | | | | | |
| OBLIGOR 9 | | | | | | | |
| OBLIGOR 10 | | | | | | | |
| ... | | | | | | | |
| ... | | | | | | | |
| ... | | | | | | | |
| OBLIGOR M | | | | | | | |
| | ↓ | ↓ | ↓ | ↓ | ↓ | ↓ | ↓ |
| | $l(z)$ | $l'(z)$ | $l''(z)$ | $v(z)$ | $v'(z)$ | $\Delta q(z)$ | $q(z)$ |
| TOTAL | | | | | | | |

INFORMATION PROCESSING APPARATUS, INFORMATION PROCESSING METHOD AND PROGRAM PRODUCT FOR FAST COMPUTATION OF RISK MEASURES AND RISK CONTRIBUTIONS

CROSS-REFERENCE TO RELATED APPLICATIONS

This application is based upon and claims the benefit of priority of the prior Japanese Patent Application Nos. 2009-131204, filed on May 29, 2009, and 2010-095350, filed on Apr. 16, 2010, the entire contents of which are incorporated herein by reference.

BACKGROUND OF THE INVENTION

1. Field of the Invention

The present invention relates to an information processing apparatus, an information processing method, and a program product.

2. Description of the Related Art

Monte Carlo methods are widely used as calculating methods of VaR (Value at Risk, a percentile according to a confidence level α) of credit risk. Further, there are DM (Default Mode) method and MTM (Mark-to-Market/market price evaluation) method as methods of modeling credit risk. The DM method is a model creating a loss distribution using only the loss in the event of default, and is used for credit risk measurement for allowing credit, including medium and small companies and retails. On the other hand, the MTM method is a model creating a profit and loss distribution considering profit and loss other than in the event of default, and is used mainly for financial products (such as bonds for example) having a marketability that requires consideration of loss due to decline in market prices.

For either model of the DM method and the MTM method, methods of calculating VaR using a Monte Carlo method are known. For example, Japanese Laid-open Patent Publication No. 2009-32237 describes explanations of modeling of the DM method and the MTM method, and a calculating method of VaR with a Monte Carlo method. Further, besides Monte Carlo methods, for example, an approach to calculate VaR analytically with respect to the DM method is disclosed in "Analytical Evaluation Method for Credit Risk of Credit Portfolio Centered on Limiting Loss Distribution and Granularity Adjustment", IMES Discussion Paper Series 2005-J-4, Institute for Monetary and Economic Studies, Bank of Japan, July 2005.

In late years, necessity of economic capital management (operating administration in the aspect of accounting management considering viewpoints such as what degree of risk, should be taken in what sector, profitability, and the like based on risk contributions of individual companies) is discussed both domestically and globally, and importance of breaking down the total VaR into "risk contributions of individual companies relative to VaR" is increasing.

However, in the above-described Monte Carlo methods, errors occur due to random numbers when calculating risk contributions, thereby causing problems such as unstable numeric values, discrepancy between the total VaR and the sum of the contributions of individual companies, taking a long time for calculation to obtain contributions in units which are too small, requiring a high-capacity memory, and so on.

On the other hand, there are proposed techniques to calculate VaR by an analytical approach. Using the analytical approach, it is possible to calculate risk contributions of individual companies accurately and rapidly. As described above, there are the DM method and the MTM method as methods of modeling credit risk, and the IMES Discussion Paper discloses an approach to calculate VaR analytically with respect to the DM method. On the other hand, the MTM method has many parameters as compared to the DM method and provides a complicated distribution, and thus has been considered to have a difficulty to calculate VaR analytically.

Now, the above-described problems will be described in more detail using drawings. FIG. 1 is a diagram representing rating transitions and losses of a obligor i by the DM method. Reference symbol $p_i$ denotes a default rate according to the rating of the obligor i. As illustrated in FIG. 1, in the DM method, ones other than default can be grouped together, and thus FIG. 1 can be expressed by a binomial distribution as illustrated in FIG. 2. FIG. 2 is a diagram illustrating an example of expressing FIG. 1 by a binomial distribution.

In the DM method, based on the rating transitions in FIG. 2, the probability distribution of loss in a portfolio is obtained as:

$$L = \sum_i L_i$$

$$D_i = l_{\{x_i < \theta_i\}}$$

$$L_i = D_i LGD_i EAD_i$$

$$p_i = E[D_i]$$

$$l_{\{b\}} = \begin{cases} 1 & \text{when } b \text{ is true} \\ 0 & \text{when } b \text{ is false} \end{cases}$$

where

L is a loss of the portfolio, $L_i$ is a loss by the obligor i, $D_i$ is a random variable indicating the status of the obligor i (default or non-default), $x_i$ is a random variable indicating the enterprise value of the obligor i, l[•] is a defined function, $p_i$ is a default rate of the obligor i, $LGD_i$ is a loss given default in exposure of the obligor i, and $EAD_i$ is an amount of exposure of the obligor i.

In practice, the default rate and the loss given default differ for every obligor included in the portfolio. Accordingly, even when an individual obligor can be expressed as in FIG. 2, the loss of the portfolio becomes a complicated probability distribution, for which it is not easy to obtain VaR.

Thus, conventionally, probability distributions and risk indicators (VaR) thereof have been calculated by simulation using a Monte Carlo method (generating random numbers corresponding to the random variable $x_i$ for the number of times of trial, and calculating in the order of $D_i \rightarrow L_i \rightarrow L$).

In late years, VaR calculating methods by analytical approximation such as granularity adjustment method have been known. Accordingly, it has become possible to stably and quickly obtain not only VaR but also risk contribution of each obligor.

$$\text{Risk contribution of a debtor } i = EAD_i \frac{\partial VaR}{\partial EAD_i}$$

$$VaR = \sum_i EAD_i \frac{\partial VaR}{\partial EAD_i}$$

are an expression for obtaining the risk contribution of the obligor i when obtaining VaR analytically in the DM method, and an expression for obtaining VaR analytically in the DM method.

On the other hand, in the MTM method, the diagram representing rating transitions and profits and losses of the obligor i becomes a polynomial distribution similar to FIG. 3, in which the number of parameters per obligor becomes large as compared to the DM method. Thus, there is a problem that the analytical approximation of VaR becomes quite difficult as compared to the DM method. Here, FIG. 3 is a diagram representing rating transitions and profits and losses of the obligor i by the MTM method. Reference symbol $p_{ir}$ denotes a rating transition probability of the obligor i from the current rating to the rating r.

SUMMARY OF THE INVENTION

The present invention is made in view of such problems, and an object thereof is to allow obtaining VaR and the like quickly in analytical approximation in an MTM method.

Accordingly, an information processing apparatus of the present invention has: a z calculating unit calculating, based on a confidence level α stored in a storage device, a percentile of a risk factor z corresponding to α; a rating threshold calculating unit obtaining a probability $p_{sk}$ of transition from a rating s to a rating k stored in the storage device, and calculating a rating threshold $\theta_{ir}$ at which the rating of a obligor i becomes a rating r or lower based on the obtained $p_{sk}$; a conditional probability calculating unit obtaining a constant $a_i$ of each obligor i stored in the storage device, and calculating a probability $ps_{ir}(z)$ that the rating of the obligor i becomes the rating r or lower under a condition that z is fixed based on the obtained $a_i$, z calculated in the z calculating unit, and the $\theta_{ir}$ calculated in the rating threshold calculating unit using $$ps_{ir}(z) = N\left(\frac{\theta_{ir} - \sqrt{a_i}\,z}{\sqrt{1 - a_i}}\right) \quad \text{Expression (1)}$$

where N is a cumulative probability function of a standard normal distribution; and a $w_{ir}$ calculating unit calculating a difference $w_{ir}$ in exposure value between adjacent ratings of the obligor i based on an exposure value $V_{ir}$ of the obligor i when transition from a current rating to the rating r occurs, which is stored in the storage device, using $$w_{ir} = V_{ir} - V_{i(r+1)} \quad \text{Expression (2)}.$$

With the information processing apparatus having such a structure, the probability $ps_{ir}(z)$ that the rating of the obligor i becomes the rating r or lower under a condition that z is fixed with respect to the probability $p_{sk}$ of transition from the rating s to the rating k can be calculated as Expression (1). Further, with the information processing apparatus having such a structure, the difference $w_{ir}$ in exposure value between adjacent ratings of the obligor i can be calculated as Expression (2) with respect to the exposure value $V_{ir}$ when transition of the obligor i from a current rating to the rating r or lower occurs. The point that the $ps_{ir}(z)$ can be calculated as Expression (1) and the $w_{ir}$ can be calculated as Expression (2) corresponds to that it is possible to express a polynomial distribution representing rating transitions and profits and losses of a obligor i in the MTM method by addition of binomial expressions. Therefore, a conditional expected value l(z) of a portfolio value V under the condition that z is fixed and a conditional variance v(z) of a portfolio value V under the condition that z is fixed can be easily (quickly) calculated, and VaR can be calculated analytically by the MTM method.

Further, an information processing method of the present invention executed by an information processing apparatus has: a z calculating step of calculating, based on a confidence level α stored in a storage device, a percentile of a risk factor z corresponding to α; a rating threshold calculating step of obtaining a probability $p_{sk}$ of transition from a rating s to a rating k stored in the storage device, and calculating a rating threshold $\theta_{ir}$ at which the rating of a obligor i becomes a rating r or lower based on the obtained $p_{sk}$; a conditional probability calculating step of obtaining a constant $a_i$ of each obligor i stored in the storage device, and calculating a probability $ps_{ir}(z)$ that the rating of the obligor i becomes the rating r or lower under a condition that z is fixed based on the obtained $a_i$, z calculated in the z calculating step, and the $\theta_{ir}$ calculated in the rating threshold calculating step using $$ps_{ir}(z) = N\left(\frac{\theta_{ir} - \sqrt{a_i}\,z}{\sqrt{1 - a_i}}\right)$$

where N is a cumulative probability function of a standard normal distribution; and a $w_{ir}$ calculating step of calculating a difference $w_{ir}$ in exposure value between adjacent ratings of the obligor i based on an exposure value $V_{ir}$ of the obligor i when transition from a current rating to the rating r occurs, which is stored in the storage device, using $w_{ir} = V_{ir} - V_{i(r+1)}$.

Further, a program product of the present invention causes a computer to function as: a z calculating unit calculating, based on a confidence level α stored in a storage device, a percentile of a risk factor z corresponding to α; a rating threshold calculating unit obtaining a probability $p_{sk}$ of transition from a rating s to a rating k stored in the storage device, and calculating a rating threshold $\theta_{ir}$ at which the rating of a obligor i becomes a rating r or lower based on the obtained $p_{sk}$; a conditional probability calculating unit obtaining a constant $a_i$ of each obligor i stored in the storage device, and calculating a probability $ps_{ir}(z)$ that the rating of the obligor i becomes the rating r or lower under a condition that z is fixed based on the obtained $a_i$, z calculated in the z calculating unit, and the $\theta_{ir}$ calculated in the rating threshold calculating unit using $$ps_{ir}(z) = N\left(\frac{\theta_{ir} - \sqrt{a_i}\,z}{\sqrt{1 - a_i}}\right)$$

where N is a cumulative probability function of a standard normal distribution; and a $w_{ir}$ calculating unit calculating a difference $w_{ir}$ in exposure value between adjacent ratings of the obligor i based on an exposure value $V_{ir}$ of the obligor i when transition from a current rating to the rating r occurs, which is stored in the storage device, using $w_{ir} = V_{ir} - V_{i(r+1)}$.

BRIEF DESCRIPTION OF THE DRAWINGS

FIG. 8 is a diagram illustrating an example of a table storing the rating transition matrix;

FIG. 9 is a diagram illustrating an example of a table storing probabilities $ps_{sr}$ of transition from a rating s to a rating r or lower;

FIG. 10 is a diagram illustrating an example of a table storing probabilities $ps_{ir}$ of transition of the obligor i to the rating r or lower;

FIG. 11 is a diagram illustrating an example of a table storing rating thresholds $\theta_{ir}$ at which the rating of the obligor i becomes the rating r or lower;

FIG. 12 is a diagram illustrating an example of a table storing a correlation matrix;

FIG. 13 is a diagram illustrating an example of a table storing correlation calculating information by obligor;

FIG. 14 is a diagram illustrating an example of a table storing probabilities $ps_{ir}(z)$ that the rating of a obligor i becomes the rating r or lower under the condition that a risk factor z is fixed (conditional probability given that the risk factor z is fixed);

FIG. 15 is a diagram illustrating an example of a table storing first derivatives $ps_{ir}'(z)$ of probabilities that the rating of a obligor i becomes the rating r or lower under the condition that the risk factor z is fixed (conditional probability given that the risk factor z is fixed);

FIG. 16 is a diagram illustrating an example of a table storing second derivatives $ps_{ir}''(z)$ of probabilities that the rating of a obligor i becomes the rating r or lower under the condition that the risk factor z is fixed (conditional probability given that the risk factor z is fixed);

FIG. 17 is a diagram illustrating an example of a table storing current ratings of obligors i and exposure values $V_{ir}$ when transition to the rating r occurs;

FIG. 18 is a diagram illustrating an example of a table storing differences $w_{ir}$ in value between adjacent ratings of obligors i;

FIG. 19 is a diagram illustrating an example of a table storing conditional expected values l(z) of portfolio values V, conditional variances of the portfolio values V, and the like;

FIG. 20 is a diagram illustrating an example of a table storing expected values of exposure values by obligor, individual company risk contributions, and so on;

FIG. 23 is a flowchart illustrating an example of processing to calculate a conditional probability or the like;

DETAILED DESCRIPTION OF THE PREFERRED EMBODIMENTS

Hereinafter, an embodiment of the present invention will be described based on the drawings.

Overview of this Embodiment

First, an overview of this embodiment will be described using FIG. 4 and FIG. 5. Incidentally, the processing illustrated below is executed by an information processing apparatus (computer) which will be described later.

Figure 1:
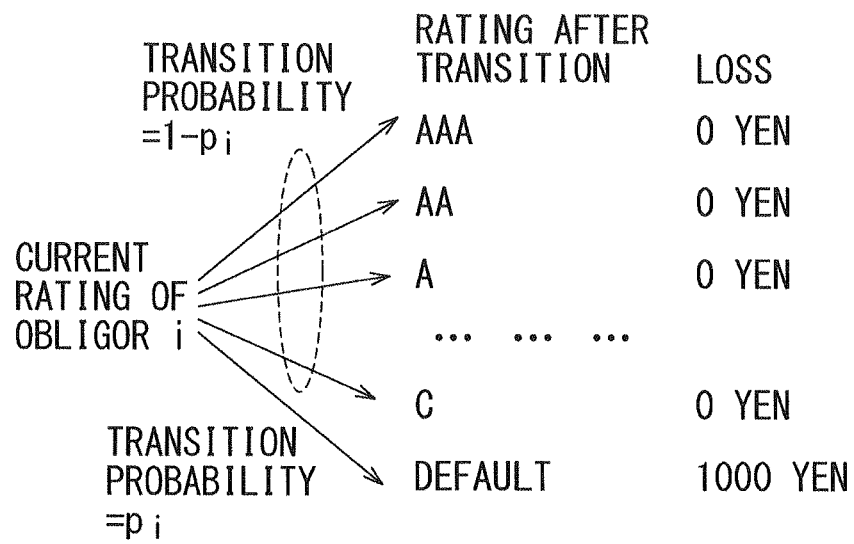
FIG. 1 is a diagram representing rating transitions and losses of a obligor i by a DM method.
Figure 2:
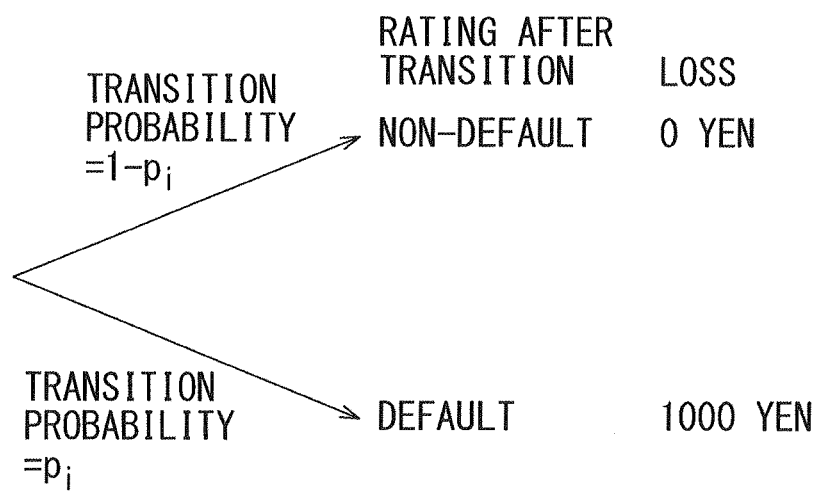
FIG. 2 is a diagram illustrating an example of expressing FIG. 1 by a binomial distribution.
Figure 3:
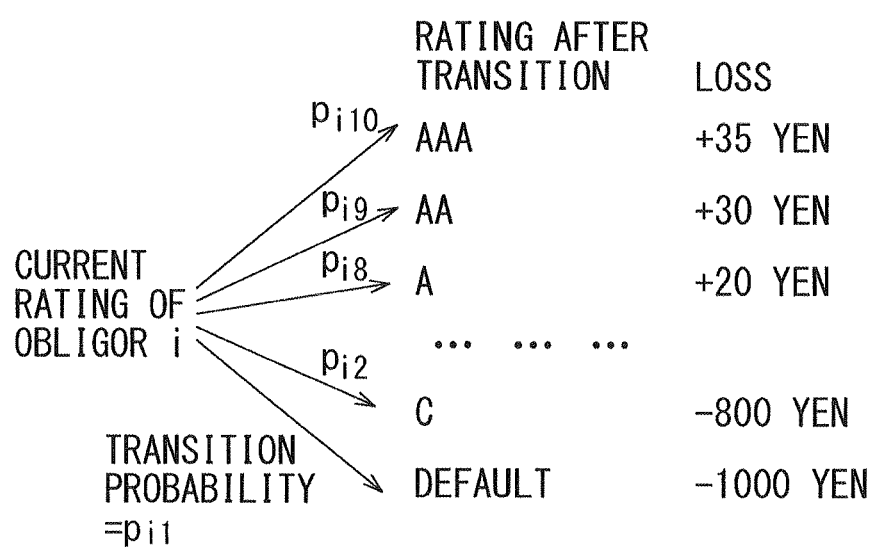
FIG. 3 is a diagram representing rating transitions and profits and losses of the obligor i by an MTM method.

As already described, a diagram representing rating transitions and profits and losses of a obligor i in the MTM method becomes a polynomial distribution like FIG. 3. However, when a probability $ps_{ir}$ of transition of a obligor i from the current rating to a rating r or lower is obtained as described later corresponding to a transition probability $p_{ir}$ of transition of the obligor i from the current rating to the rating r in a Merton model (enterprise value model), and a difference $w_{ir}$ in exposure value between adjacent ratings of the obligor i is obtained as described later corresponding to an exposure value $V_{ir}$ of the obligor when transition from the current rating to the rating r occurs, the polynomial distribution like FIG. 3 can be expressed by addition of binomial distributions as illustrated in FIG. 4.

Figure 4:
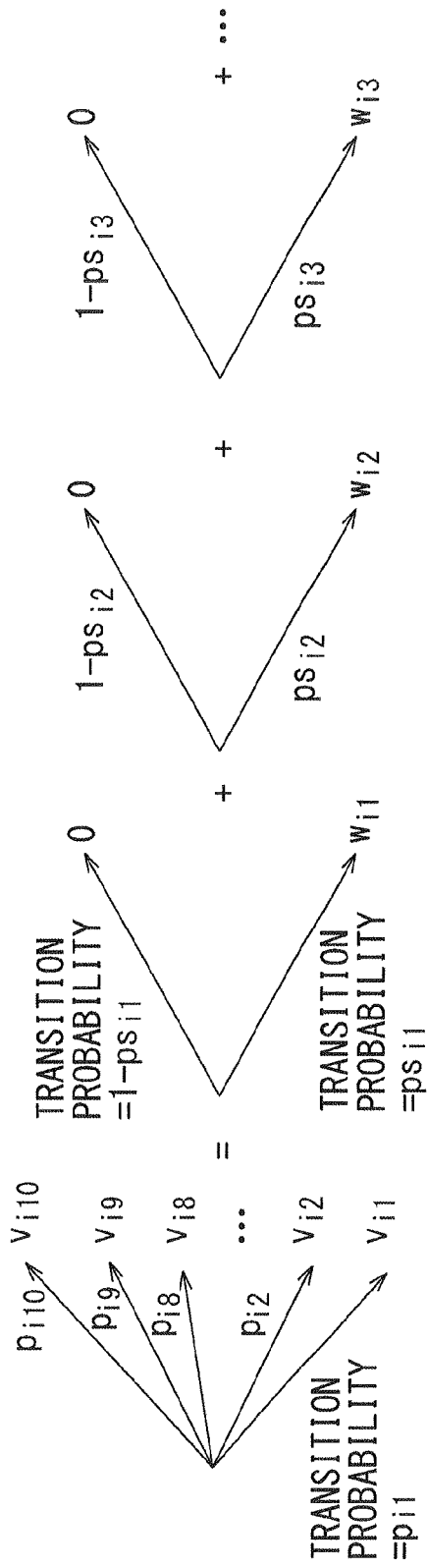
FIG. 4 is a diagram illustrating an example of expressing a polynomial distribution as in FIG. 3 by addition of binomial distributions.
Figure 5:
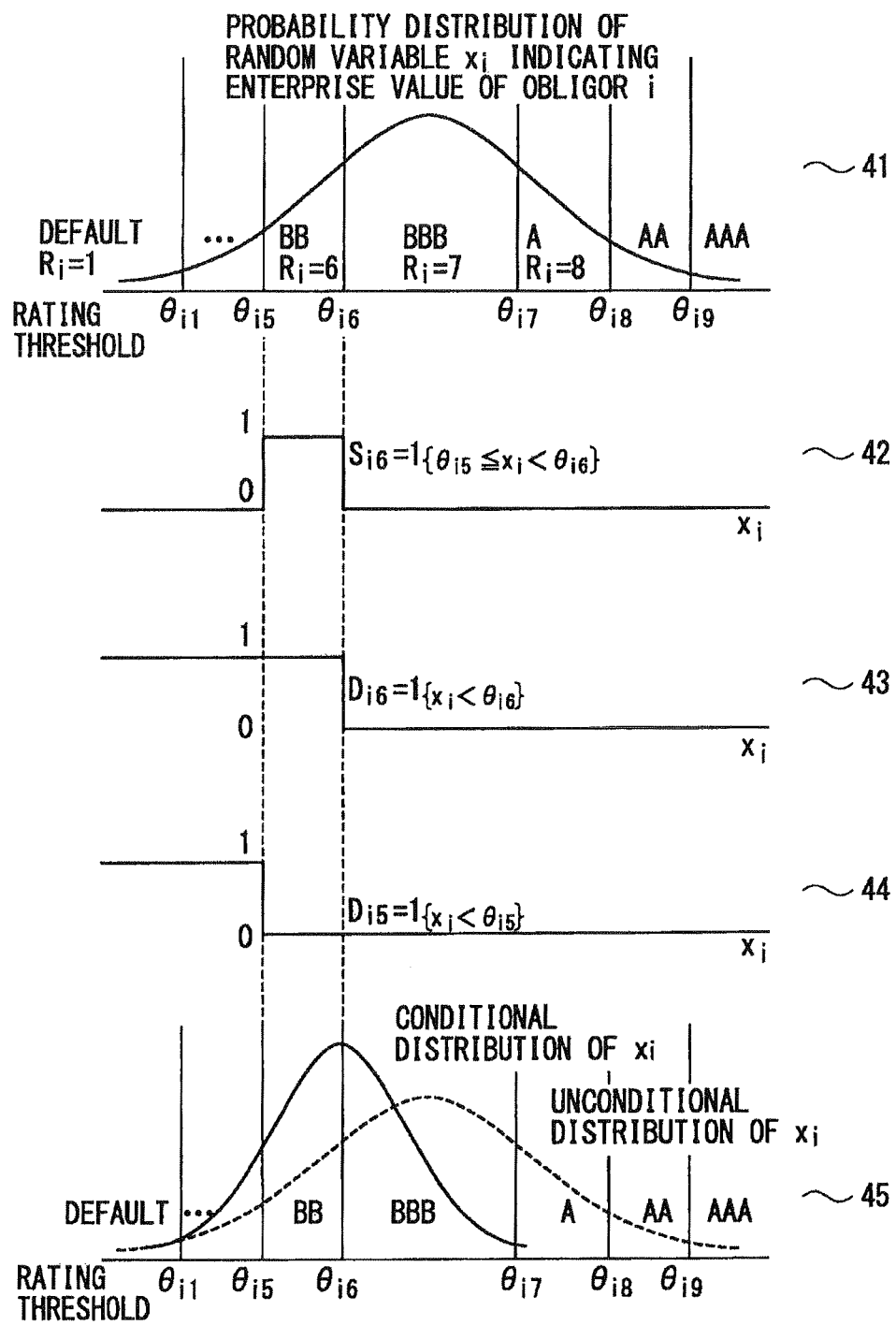
FIG. 5 is a diagram for explaining FIG. 4 in consideration of an enterprise value model.

Here, FIG. 5 is a diagram for explaining FIG. 4 in consideration of an enterprise value model.

In the MTM method, the information processing apparatus obtains the transition probability $p_{ir}$ according to the rating of a obligor i from a probability transition matrix stored in a storage device such as an HD, and a rating threshold $\theta_{ir}$ is obtained so that the relation of $$p_{ir}=E[I_{\{\theta_{i(r-1)} \leq x_i < \theta_{ir}\}}]=N(\theta_{ir})-N(\theta_{i(r-1)})$$

holds true, using $$ps_{ir} = \sum_{k=1}^{r} p_{ik}$$

$$\theta_{ir} = N^{-1}(ps_{ir}),$$

where $ps_{ir}$ is a probability of transition of the obligor i to the rating r or lower, N(•) is a cumulative probability function of a standard normal distribution, and $N^{-1}$(•) is an inverse function of NH.

Incidentally, here the smaller the r is, the lower the rating it denotes.

Using $\theta_{ir}$, the function indicating a transition to rating BB can be represented as 42 in FIG. 5.

Here, using 43 and 44 in FIG. 5, 42 of FIG. 5 can be expressed as 43-44 of FIG. 5. That is, 43 and 44 of FIG. 5 are forms similar to $D_i$ used in the DM method, and corresponds to the binomial distribution. This facilitates calculation of an expected value and a distribution. Besides the rating BB, it can be expanded as follows by expressions using $S_{ir}$ and $D_{ir}$.

$$D_{ir} = 1_{\{x_i < \theta_{ir}\}}$$
$$ps_{ir} = E[D_{ir}]$$
$$S_{ir} = D_{ir} - D_{i(r-1)}$$
$$V_i = \sum_r S_{ir} V_{ir} = \sum_r D_{ir} w_{ir}$$

This corresponds to expressing a polynomial distribution by addition of binomial distributions as in FIG. 4. Incidentally, mathematically a polynomial distribution cannot always be expressed by addition of binomial distributions, and the relational expressions illustrated above are relations derived by devising an expanding method in an enterprise value model.

Here, $$w_{ir} = V_{ir} - V_{i(r+1)},$$

$S_{ir}$ is a random variable denoting the status of a obligor i (whether $R_i$ is r or not), $R_i$ is a rating of the obligor i after rating transition, $D_{ir}$ is a random variable indicating the status of the obligor i (whether or not $R_i$ is equal to or lower than rating r), $V_i$ is a value of exposure after rating transition of the obligor i, and $V_{ir}$ is a value of exposure when the rating of the obligor i is the rating r.

In calculation with the enterprise value model, generally an expressing method of $x_i$ like the following expression for example is used.

$$x_i = \sqrt{a_i} z + \sqrt{1 - a_i} \zeta_i$$

Here, z is a risk factor, $a_i$ is a constant representing the dependence of an enterprise value $x_i$ on z, and $\zeta_i$ is a factor not expressed by z in an enterprise value $x_i$ of the obligor i.

In the above expression, a conditional probability when the random variable z is fixed to a certain value as 45 in FIG. 5 is considered. Here, an expected value l(z) and a variance v(z) of the portfolio value V are needed for analytical approximation of VaR. However, expressing a polynomial distribution by addition of binomial distributions as described above is also possible here, and it is possible to obtain l(z) and v(z) by calculation based on a probability $ps_{ir}(z)$ of transition of the obligor to the rating r or lower.

For example, in the case of multifactor with the model being expanded or in the case where it is not necessarily be Corr($\zeta_i$, $\zeta_j$)=0, particularly calculation of v(z) and v'(z) becomes difficult, but the possibility of expression by binomial distributions facilitates calculation. Describing more specifically, it is difficult to perform the calculations as in the supplemental theories 4, 5 of the IMES Discussion Paper in the DM method as the polynomial distributions as they are similarly for the MTM method, but expression by addition of binomial distributions facilitates these calculations.

$$ps_{ir}(z) = E[D_{ir} | z]$$
$$ps'_{ir}(x) = \frac{d}{dz} ps_{ir}(z), \; ps''_{ir}(z) = \frac{d^2}{dz^2} ps_{ir}(z)$$

-continued $$l(z) = E[V | z]$$
$$l'(z) = \frac{d}{dz} l(z), \; l''(z) = \frac{d^2}{dz^2} l(z)$$
$$v(z) = \text{Var}[V | z]$$
$$v'(z) \frac{d}{dz} v(z)$$

As described above, the conditional expected value l(z) and the variance v(z) of the portfolio value and derivatives of them, which are required for calculating granularity adjustment, can be calculated also in the case of polynomial distributions of the MTM method. Consequently, a portfolio VaR (percentile qα according to a confidence level α) and a risk contribution of an individual company can be calculated.

$$\Delta q_\alpha(z) = -\frac{1}{2l'(z)} \left( v'(z) - v(z) \left( \frac{l''(z)}{l'(z)} + z \right) \right)$$
$$q_\alpha = (l(z) + \Delta q_\alpha(z))|_{z=N^{-1}(1-\alpha)}$$

As the analytical approximation as above, besides the above ones, saddle point approximation and the like are known. In the saddle point approximation and the like, numerical integration may be required other than the analytical method (closed-form). In this embodiment, the numerical integration is not necessary as described above, and a VaR and an individual company risk contribution can be calculated by only the closed-form. That is, according to this embodiment, it is possible to rapidly calculate the VaR and rapidly and stably calculate the individual company risk contribution.

Further, according to this embodiment, a granularity adjustment method can be applied to the MTM method. In calculation by the granularity adjustment method, dividing into a term that can be ignored and a term that cannot be ignored is possible in a limiting loss distribution (assuming that there is no credit concentration), and thus it is useful in view of grasping the influence of credit concentration.

Incidentally, when a VaR obtained by a Monte Carlo method can be obtained, this VaR may be assumed as a regular value, and the individual company risk contribution can be corrected by multiplying a correction ratio c as shown by the following expressions so that a VaR obtained by analytical approximation matches a VaR obtained by the Monte Carlo method.

c=VaR by Monte Carlo/VaR by analytical approximation

Individual risk contribution of a obligor i c·(individual
company risk contribution of the obligor
obtained by the analytical approximation)

<Hardware Structure>

Figure 6:
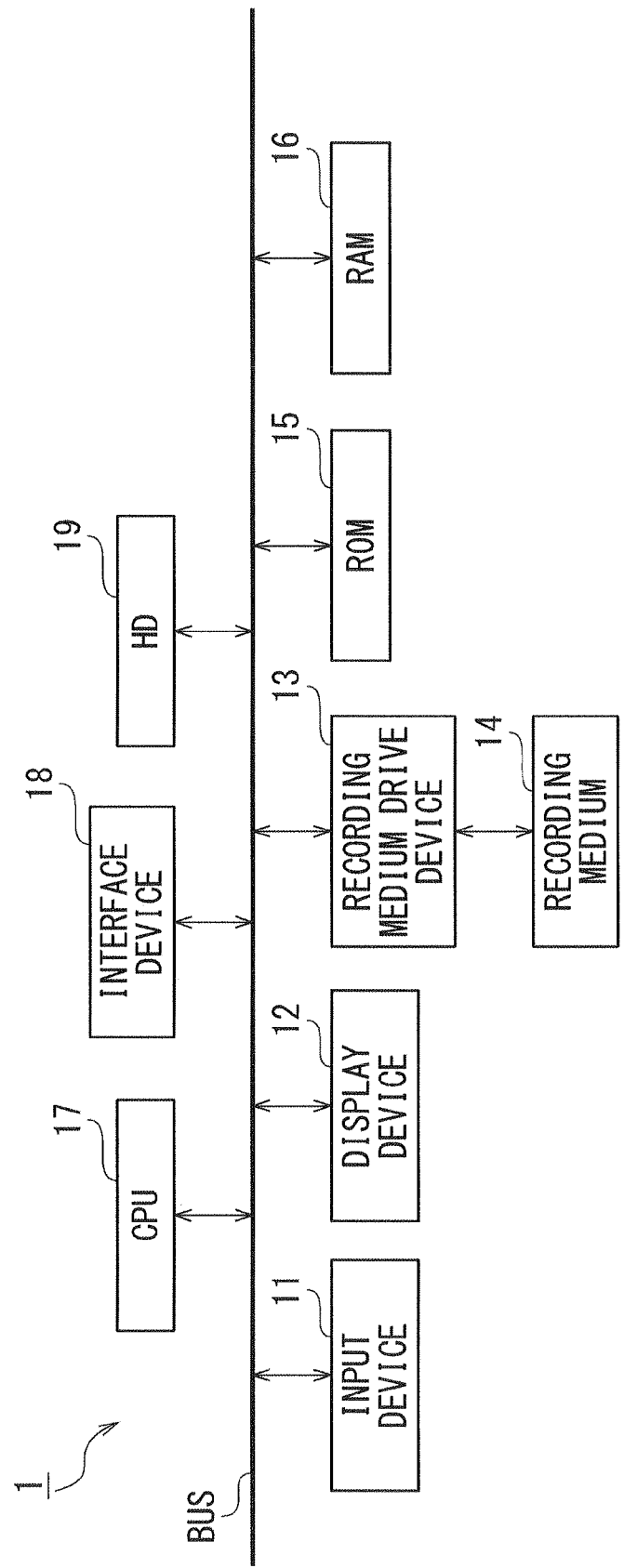
FIG. 6 is a diagram illustrating an example of a hardware structure of an information processing apparatus.

FIG. 6 is a diagram illustrating an example of a hardware structure of an information processing apparatus. As illustrated in FIG. 6, an information processing apparatus 1 includes, as hardware components, an input device 11, a display device 12, a recording medium drive device 13, a ROM (Read Only Memory) 15, a RAM (Random Access Memory) 16, a CPU (Central Processing Unit) 17, an interface device 18, and an HD (Hard Disk) 19.

The input device 11 is formed of a keyboard, a mouse, and/or the like operated by an operator (or user) of the information processing apparatus 1, and is used for inputting various operation information or the like to the information processing apparatus 1. The display device 12 is formed of a display or the like used by the user of the information processing apparatus 1, and is used for displaying various information (or screen) and the like. The interface device 18 is an interface connecting the information processing apparatus 1 to a network or the like.

A program product related to flowcharts which will be described later is provided to the information processing apparatus 1 by, for example, a recording medium 14 such as a CD-ROM, or is downloaded via a network or the like. The recording medium 14 is set to the recording medium drive device 13, and the program product is installed from the recording medium 14 to the HD 19 via the recording medium drive device 13.

The ROM 15 stores a program and the like which are read first when the power of the information processing apparatus 1 is turned on. The RAM 16 is a main memory of the information processing apparatus 1. The CPU 17 reads a program from the HD 19 as necessary, stores it in the RAM 16, and executes this program, so as to provide part of functions which will be described later, or executes a flowchart or the like which will be described later. The RAM 16 stores, for example, a table and/or the like which will be described later.

<Software Structure>

Figure 7:
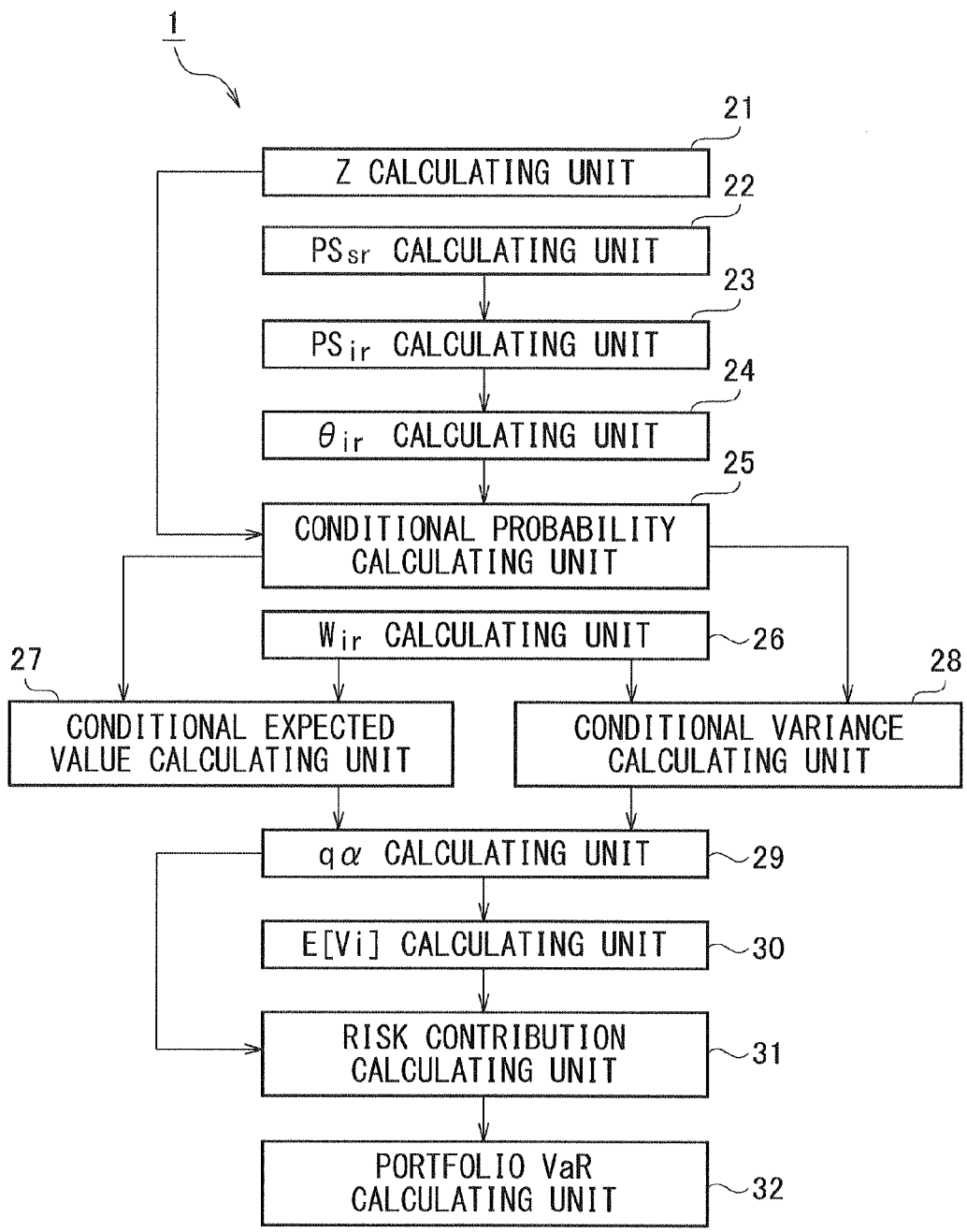
FIG. 7 is a diagram illustrating an example of a software structure of the information processing apparatus.

FIG. 7 is a diagram illustrating a software structure of the information processing apparatus.

As illustrated in FIG. 7, the information processing apparatus 1 includes, as software components, a z calculating unit 21, a $ps_{sr}$ calculating unit 22, a $ps_{ir}$ calculating unit 23, a $\theta_{ir}$ calculating unit 24, a conditional probability calculating unit 25, a $w_{ir}$ calculating unit 26, a conditional expected value calculating unit 27, a conditional variance calculating unit 28, a q$\alpha$ calculating unit 29, an E[$V_i$] calculating unit 30, a risk contribution calculating unit 31, and a portfolio VaR calculating unit 32.

The z calculating unit 21 obtains a confidence level $\alpha$ as a parameter from the RAM 16 or the like for example, and calculates the percentile of the risk factor z corresponding to the obtained confidence level $\alpha$ using $$z = N^{-1}(1-\alpha).$$

Incidentally, the parameter may be inputted by the operator of the information processing apparatus 1 via the input device 11 or the like and stored in the RAM 16 or the like, or may be stored in advance in the HD 19 or the like. The same applies to the parameters below.

The $ps_{sr}$ calculating unit 22 obtains a rating transition matrix (probability $p_{sr}$ of transition from the current rating s to the rating r) illustrated in FIG. 8 as a parameter from the RAM 16 or the like for example, obtains a probability $ps_{sr}$ of transition from the current rating s to the rating r or lower based on the obtained probability $p_{sr}$ of transition from the current rating s to the rating r, and substitutes it in the corresponding part of a table as illustrated in FIG. 9. Here, FIG. 8 is a diagram illustrating an example of a table storing the rating transition matrix. FIG. 9 is a diagram illustrating an example of a table storing probabilities $ps_{sr}$ of transition from the rating s to the rating r or lower.

The $ps_{ir}$ calculating unit 23 calculates the probability $ps_{ir}$ of transition of a obligor i to the rating r or lower based on the probability $ps_{sr}$ of transition from the rating s to the rating r or lower as illustrated in FIG. 9 calculated in the $ps_{sr}$ calculating unit 22. Describing more specifically, the $ps_{ir}$ calculating unit 23 obtains the current rating of the obligor i from rating information by obligor as illustrated in FIG. 17 which will be described later, obtains the corresponding probability $ps_{sr}$ of transition from the rating s to the rating r or lower from FIG. 9 (for example, obtains the portion surrounded by a dotted line in FIG. 9) based on the obtained rating information, and substitutes it in a table as illustrated in FIG. 10 (for example, in the part surrounded by a dotted line in FIG. 9). FIG. 10 is a diagram illustrating an example of a table storing probabilities $ps_{ir}$ of transition of the obligor i to the rating r or lower.

Here, when there are plural rating systems, there exist tables corresponding to FIG. 8 and FIG. 9 matching the number of rating systems. In this case, the $ps_{ir}$ calculating unit 23 obtains a value with reference to FIG. 8 and FIG. 9 of the corresponding rating system for each obligor.

The $f_{ir}$ calculating unit 24 obtains the probability $ps_{ir}$ of transition of a obligor i to the rating r or lower as illustrated in FIG. 10 calculated in the $ps_{ir}$ calculating unit 23 from the RAM 16 or the like, calculates a rating threshold $\theta_{ir}$ at which the rating of the obligor i becomes the rating r or lower based on the obtained probability $ps_{ir}$ using $$\theta_{ir} = N^{-1}(ps_{ir})$$

and substitutes it in the corresponding part of a table as illustrated in FIG. 11. FIG. 11 is a diagram illustrating an example of a table storing rating thresholds $\theta_{ir}$ at which the rating of the obligor i becomes the rating r or lower.

The conditional probability calculating unit 25 obtains a value $a_i$ as a parameter given in units of obligors from the RAM 16 or the like for example, and calculates a probability $ps_{ir}(z)$ that the rating of a obligor i changes to the rating r or lower under the condition that the risk factor z is fixed based on the obtained value $a_i$ given in units of obligors, the percentile of the risk factor z corresponding to the confidence level $\alpha$ calculated in the z calculating unit 21, and $\theta_{ir}$ calculated in the $\theta_{ir}$ calculating unit 24 using $$ps_{ir}(z) = N\left(\frac{\theta_{ir} - \sqrt{a_i}\, z}{\sqrt{1-a_i}}\right)$$

and substitutes it in the corresponding part of a table as illustrated in FIG. 14.

Incidentally, here the value $a_i$ given in units of obligors is calculated in units of obligors using a correlation matrix illustrated in FIG. 12 and correlation calculation information by obligor illustrated in FIG. 13 (a specific calculating method is shown in the IMES Discussion Paper or the like, and thus details are omitted in this embodiment).

FIG. 14 is a diagram illustrating an example of a table storing probabilities $ps_{ir}(z)$ that the rating of a obligor i becomes the rating r or lower under the condition that the risk factor z is fixed (conditional probability given that the risk factor z is fixed).

Further, the conditional probability calculating unit 25 similarly calculates a first derivative $ps_{ir}'(z)$ of the probability $ps_{ir}(z)$ that the rating of a obligor i becomes the rating r or lower under the condition that the risk factor z is fixed using $$ps_{ir}'(z) = -\sqrt{\frac{a_i}{1-a_i}}\, n\left(\frac{\theta_{ir} - \sqrt{a_i}\, z}{\sqrt{1-a_i}}\right)$$

and substitutes it in the corresponding part of a table as illustrated in FIG. 15.

FIG. 15 is a diagram illustrating an example of a table storing first derivatives $ps_{ir}'(z)$ of probabilities that the rating of a obligor i becomes the rating r or lower under the condition that the risk factor z is fixed (conditional probability given that the risk factor z is fixed).

Further, the conditional probability calculating unit 25 similarly calculates a second derivative $ps_{ir}''(z)$ of the probability $ps_{ir}(z)$ that the rating of a obligor i becomes the rating r or lower under the condition that the risk factor z is fixed using $$ps_{ir}''(z) = -\frac{a_i}{1-a_i} \cdot \frac{\theta_{ir} - \sqrt{a_i}\, z}{\sqrt{1-a_i}} n\left(\frac{\theta_{ir} - \sqrt{a_i}\, z}{\sqrt{1-a_i}}\right)$$

and substitutes it in the corresponding part of a table as illustrated in FIG. 16.

FIG. 16 is a diagram illustrating an example of a table storing second derivatives $ps_{ir}''(z)$ of probabilities that the rating of a obligor i becomes the rating r or lower under the condition that the risk factor z is fixed (conditional probability given that the risk factor z is fixed).

The $w_{ir}$ calculating unit 26 calculates a difference $w_{ir}$ in value between adjacent ratings of a obligor i based on the current rating of the obligor and the exposure value $V_{ir}$ when transition to the rating r occurs using $$w_{ir} = V_{ir} - V_{i(r+1)}$$

as illustrated in FIG. 17 as a parameter, and substitutes the calculated $w_{ir}$ in the corresponding position of a table as illustrated in FIG. 18.

FIG. 17 is a diagram illustrating an example of a table storing current ratings of obligors i and exposure values $V_{ir}$ when transition to the rating r occurs. FIG. 18 is a diagram illustrating an example of a table storing differences $w_{ir}$ in value between adjacent ratings of obligors i.

The conditional expected value calculating unit 27 calculates a conditional expected value $l(z)$ of a portfolio value V and a conditional expected value $l_i(z)$ of the portfolio value V of each obligor based on the difference $w_{ir}$ in value between adjacent ratings of a obligor i as illustrated in FIG. 18 calculated in the $w_{ir}$ calculating unit 26, and the probability $ps_{ir}(z)$ that the rating of the obligor i becomes the rating r or lower under the condition that the risk factor z is fixed as illustrated in FIG. 14 calculated in the conditional probability calculating unit 25 using $$l_i(z) = \sum_r w_{ir} ps_{ir}(z) \qquad \text{Expression 3}$$

$$l(z) = E[V \mid z] = \sum_i l_i(z)$$

and substitutes the $l_i(z)$ in the corresponding part of a table as illustrated in FIG. 19 for example.

FIG. 19 is a diagram illustrating an example of a table storing conditional expected values $l(z)$ of portfolio values V, conditional variances of the portfolio values V, and the like.

Further, the conditional expected value calculating unit 27 similarly calculates a first derivative $l'(z)$ of a conditional expected value $l(z)$ of a portfolio value V and a first derivative $l_i'(z)$ of a conditional expected value $l_i(z)$ of the portfolio value V of each obligor using $$l_i'(z) = \sum_r w_{ir} ps_{ir}'(z)$$

$$l'(z) = \frac{d}{dz} E[V \mid z] = \sum_i l_i'(z)$$

and substitutes the $l_i'(z)$ in the corresponding part of the table as illustrated in FIG. 19 for example.

Further, the conditional expected value calculating unit 27 similarly calculates a second derivative $l''(z)$ of a conditional expected value $l(z)$ of a portfolio value V and a second derivative $l_i''(z)$ of a conditional expected value $l_i(z)$ of the portfolio value V of each obligor using $$l_i''(z) = \sum_r w_{ir} ps_{ir}''(z)$$

$$l''(z) = \frac{d^2}{dz^2} E[V \mid z] = \sum_i l_i''(z)$$

and substitutes the $l_i''(z)$ in the corresponding part of the table as illustrated in FIG. 19 for example.

The conditional variance calculating unit 28 calculates a conditional variance $v(z)$ of a portfolio value V and a partial distribution $v_i(z)$ of each obligor of $v(z)$ based on the difference $w_{ir}$ in value between adjacent ratings of a obligor i as illustrated in FIG. 18 calculated in the $w_{ir}$ calculating unit 26, and the probability $ps_{ir}(z)$ that the rating of the obligor i becomes the rating r or lower under the condition that the risk factor z is fixed as illustrated in FIG. 14 calculated in the conditional probability calculating unit 25 using $$v_i(z) = V_i \frac{\partial}{\partial V_i} \text{Var}[V \mid z] \qquad \text{Expression (4)}$$

$$v(z) = \frac{1}{2} \sum_i v_i(z)$$

and substitutes the $v_i(z)$ in the corresponding part of the table as illustrated in FIG. 19 for example.

Further, the conditional variance calculating unit 28 similarly calculates a first derivative $v'(z)$ of a conditional variance $v(z)$ of a portfolio value V and a partial distribution $v_i'(z)$ of each obligor of $v'(z)$ using $$v_i'(z) = V_i \frac{\partial}{\partial V_i} \cdot \frac{d}{dz} \text{Var}[V \mid z]$$

$$v'(z) = \frac{1}{2} \sum_i v_i'(z)$$

and substitutes the $v_i'(z)$ in the corresponding part of the table as illustrated in FIG. 19 for example.

The $q\alpha$ calculating unit 29 calculates a percentile $q\alpha$ or the like of a portfolio value according to the confidence level $\alpha$ based on the conditional expected value $l_i(z)$, the first derivative $l_i'(z)$, and the second derivative $l_i''(z)$ of a portfolio value V of each obligor calculated in the conditional expected value calculating unit 27 and stored in the table as illustrated in FIG. 19, and the $v_i(z)$ and the first derivative $v_i'(z)$ calculated in the conditional variance calculating unit 28 and stored in the table as illustrated in FIG. 19 using $$\Delta q_{\alpha i}(z) = V_i \frac{\partial}{\partial V_i}\left\{-\frac{1}{2l'(z)}\left(v'(z) - v(z)\left(\frac{l''(z)}{l'(z)} + z\right)\right)\right\}$$

$$\Delta q_\alpha(z) = \sum_i \Delta q_{\alpha i}$$

$$q_{\alpha i} = (l_i(z) + \Delta q_{\alpha i}(z))|_{z=N^{-1}(1-\alpha)}$$

$$q_\alpha = \sum_i q_{\alpha i}$$

and substitutes the calculated $q\alpha_i$ or $\Delta q\alpha_i(z)$ in the corresponding part of the table as illustrated in FIG. 19.

Figure 20:
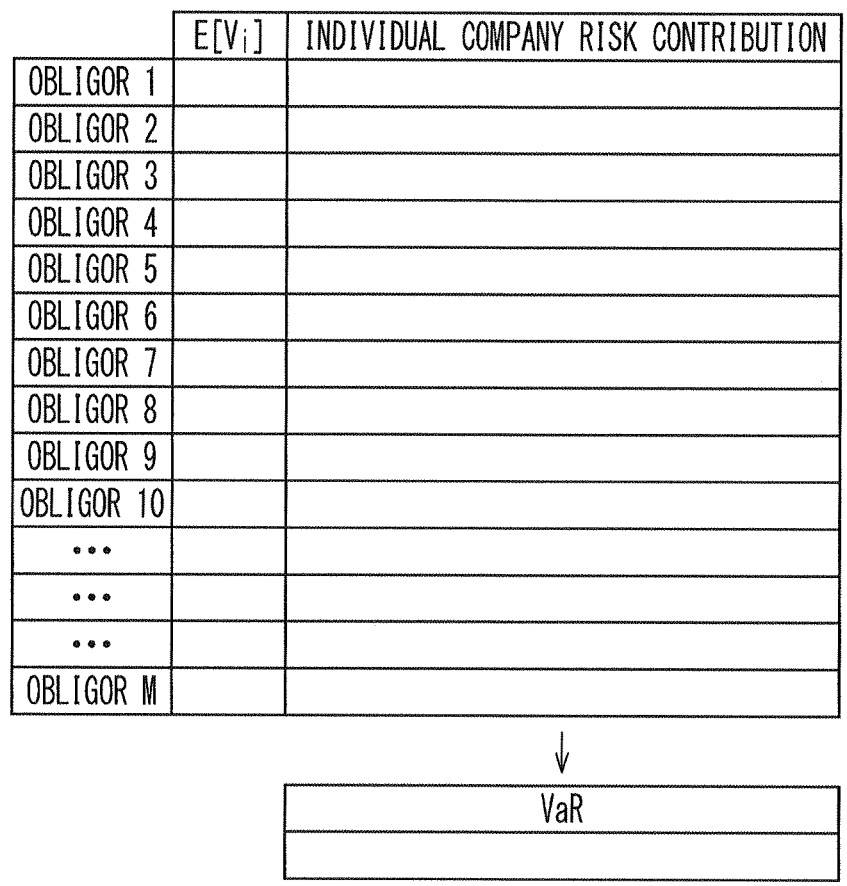

The $E[V_i]$ calculating unit 30 obtains a rating transition matrix (probability $p_{sr}$ of transition from the current rating s to the rating r) illustrated in FIG. 8 as a parameter from the RAM 16 or the like for example and obtains an exposure value $V_{ir}$ of a obligor when transition from the current rating to the rating r occurs as illustrated in FIG. 17 as a parameter from the RAM 16 or the like for example, and calculates an expected value $E[V_i]$ of an exposure value of a obligor i based on the obtained probability $p_{sr}$ of transition from the current rating to the rating r and the obtained current rating of the obligor i and exposure value $V_{ir}$ when transition to the rating r occurs using $$E[V_i] = \sum_r p_{ir} V_{ir}$$

and substitutes the calculated $E[V_i]$ in the corresponding position of a table as illustrated in FIG. 20.

FIG. 20 is a diagram illustrating an example of a table storing expected values of exposure values by obligor, individual company risk contributions, and so on.

The risk contribution calculating unit 31 calculates a risk contribution (individual company risk contribution) of a obligor i based on the $E[V_i]$ calculated in the $E[V_i]$ calculating unit 30 and stored in the table as illustrated in FIG. 20 and the $q\alpha_i$ calculated in the $q\alpha$ calculating unit 29 and stored in the table as illustrated in FIG. 19 using risk contribution of a obligor $i = q\alpha_i - E[V_i]$ for example and substitutes the calculated risk contribution of the obligor i in the corresponding part of the table as illustrated in FIG. 20.

The portfolio VaR calculating unit 32 calculates a portfolio VaR based on the risk contribution of a obligor i calculated in the risk contribution calculating unit 31 and stored in the table as illustrated in FIG. 20 using $$\text{Portfolio } VaR = q\alpha - \sum_i E[V_i] = \sum_i \text{risk contribution of an obligor } i$$

for example and substitutes the calculated risk contribution of the obligor i in the corresponding part of the table as illustrated in FIG. 20.

Hereinafter, processing of the information processing apparatus will be described using flowcharts.

Figure 21:
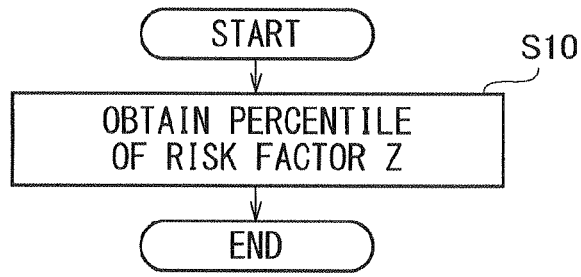
FIG. 21 is a flowchart illustrating an example of processing to calculate a percentile of the risk factor z corresponding to a confidence level α.

FIG. 21 is a flowchart illustrating an example of processing to calculate the percentile of the risk factor z corresponding to the confidence level $\alpha$.

In step S10, the z calculating unit 21 obtains a confidence level $\alpha$ as a parameter from the RAM 16 or the like for example, and calculates the percentile of the risk factor z corresponding to the obtained confidence level $\alpha$ using $$z = N^{-1}(1-\alpha).$$

Figure 22:
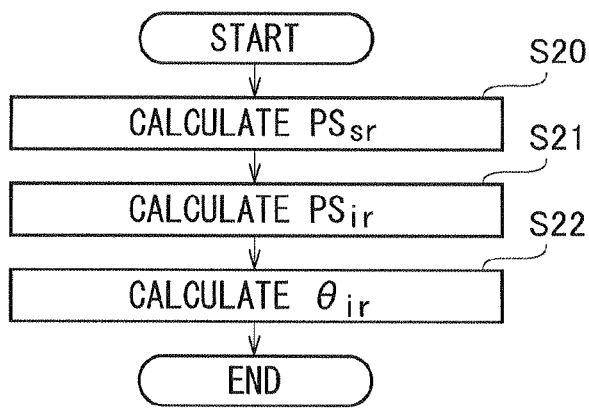
FIG. 22 is a flowchart illustrating an example of processing to calculate a rating threshold $\theta_{ir}$ at which the rating of a obligor i becomes the rating r or lower.

FIG. 22 is a flowchart illustrating an example of processing to calculate the rating threshold $\theta_{ir}$ at which the rating of a obligor i becomes the rating r or lower.

In step S20, the $ps_{sr}$ calculating unit 22 obtains a rating transition matrix (probability $p_{sr}$ of transition from the current rating s to the rating r) illustrated in FIG. 8 as a parameter from the RAM 16 or the like for example, obtains a probability $ps_{sr}$ of transition from the current rating s to the rating r or lower based on the obtained probability $p_{sr}$ of transition from the current rating s to the rating r, and substitutes it in the corresponding part of a table as illustrated in FIG. 9.

In step S21, the $ps_{ir}$ calculating unit 23 calculates the probability $ps_{ir}$ of transition of a obligor i to the rating r or lower based on the probability $ps_{sr}$ of transition from the rating s to the rating r or lower as illustrated in FIG. 9 calculated in step S20, and substitutes it in the corresponding part of a table as illustrated in FIG. 10.

In step S22, the $\theta_{ir}$ calculating unit 24 obtains the probability $ps_{ir}$ of transition of a obligor i to the rating r or lower as illustrated in FIG. 10 calculated in step S21 from the RAM 16 or the like, calculates a rating threshold $\theta_{ir}$ at which the rating of the obligor i becomes the rating r or lower based on the obtained probability $ps_{ir}$ using $$\theta_{ir} = N^{-1}(ps_{ir})$$

and substitutes it in the corresponding part of a table as illustrated in FIG. 11.

Figure 23:
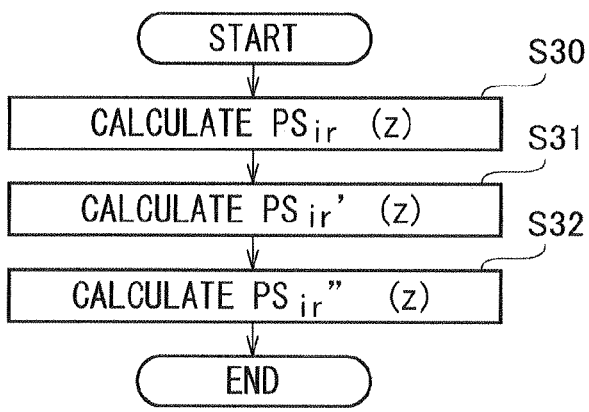

FIG. 23 is a flowchart illustrating an example of processing to calculate the conditional probability or the like.

In step S30, the conditional probability calculating unit 25 obtains a value $a_i$ as a parameter given in units of obligors from the RAM 16 or the like for example, and calculates a probability $ps_{ir}(z)$ that the rating of a obligor i changes to the rating r or lower under the condition that the risk factor z is fixed based on the obtained $a_i$, the percentile of the risk factor z corresponding to the confidence level $\alpha$ calculated in the z calculating unit 21, and $\theta_{ir}$ calculated in the $\theta_{ir}$ calculating unit 24 using $$ps_{ir}(z) = N\left(\frac{\theta_{ir} - \sqrt{a_i}\,z}{\sqrt{1-a_i}}\right)$$

and substitutes it in the corresponding part of a table as illustrated in FIG. 14.

In step S31, the conditional probability calculating unit 25 similarly calculates a first derivative $ps_{ir}'(z)$ of the probability $ps_{ir}(z)$ that the rating of a obligor i becomes the rating r or lower under the condition that the risk factor z is fixed using $$ps_{ir}'(z) = -\sqrt{\frac{a_i}{1-a_i}}\, n\left(\frac{\theta_{ir} - \sqrt{a_i}\,z}{\sqrt{1-a_i}}\right)$$

and substitutes it in the corresponding part of a table as illustrated in FIG. 15.

In step S32, the conditional probability calculating unit 25 similarly calculates a second derivative $ps_{ir}''(z)$ of the probability $ps_{ir}(z)$ that the rating of a obligor I becomes the rating r or lower under the condition that the risk factor z is fixed using $$ps''_{ir}(z) = -\frac{a_i}{1-a_i} \cdot \frac{\theta_{ir} - \sqrt{a_i}\,z}{\sqrt{1-a_i}} n\left(\frac{\theta_{ir} - \sqrt{a_i}\,z}{\sqrt{1-a_i}}\right)$$

and substitutes it in the corresponding part of a table as illustrated in FIG. 16.

Figure 24:
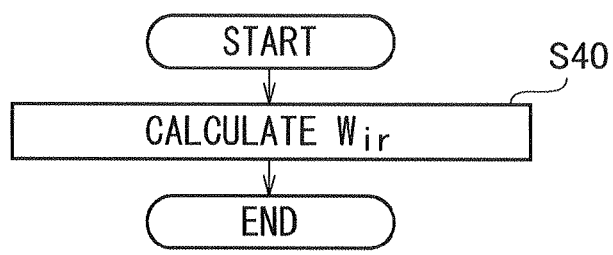
FIG. 24 is a flowchart illustrating an example of processing to calculate a difference $w_{ir}$ in value between adjacent ratings of a obligor i.

FIG. 24 is a flowchart illustrating an example of processing to calculate the difference $w_{ir}$ in value between adjacent ratings of a obligor i.

In step S40, the $w_{ir}$ calculating unit 26 calculates a difference $w_{ir}$ in value between adjacent ratings of a obligor I based on the current rating of the obligor I and the exposure value $V_{ir}$ when transition to the rating r occurs using $$w_{ir} = V_{ir} - V_{i(r+1)}$$

as illustrated in FIG. 17 as a parameter, and substitutes the calculated $w_{ir}$ in the corresponding position of a table as illustrated in FIG. 18.

Figure 25:
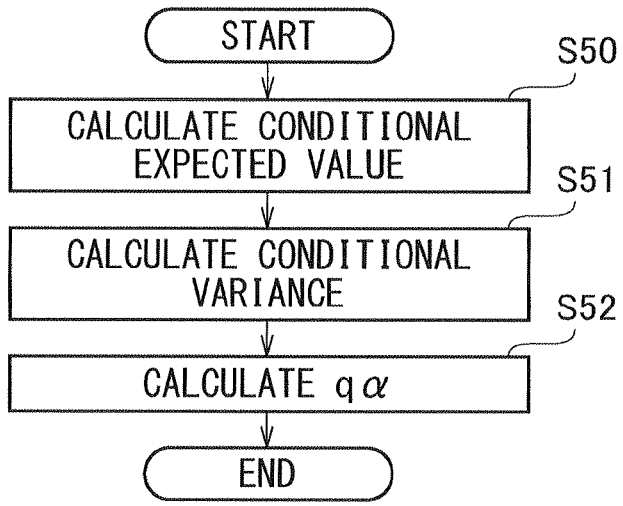
FIG. 25 is a flowchart illustrating an example of processing to calculate a percentile qα of a portfolio value or the like according to the confidence level α.

FIG. 25 is a flowchart illustrating an example of processing to calculate the percentile $q\alpha$ of a portfolio value or the like according to the confidence level $\alpha$.

In step S50, the conditional expected value calculating unit 27 calculates a conditional expected value l(z) of a portfolio value V and a conditional expected value $l_i(z)$ of the portfolio value V of each obligor based on the difference $w_{ir}$ in value between adjacent ratings of a obligor I as illustrated in FIG. 18 calculated in the processing of FIG. 24, and the probability $ps_{ir}(z)$ that the rating of the obligor I becomes the rating r or lower under the condition that the risk factor z is fixed as illustrated in FIG. 14 calculated in the processing of FIG. 23 using $$l_i(z) = \sum_r w_{ir} ps_{ir}(z)$$

$$l(z) = E[V \mid z] = \sum_i l_i(z)$$

and substitutes the $l_i(z)$ in the corresponding part of a table as illustrated in FIG. 19 for example.

Further, the conditional expected value calculating unit 27 similarly calculates a first derivative l'(z) of a conditional expected value l(z) of a portfolio value V and a first derivative $l_i'(z)$ of a conditional expected value $l_i(z)$ of the portfolio value V of each obligor using $$l_i'(z) = \sum_r w_{ir} ps'_{ir}(z)$$

$$l'(z) = \frac{d}{dz} E[V \mid z] = \sum_i l_i'(z)$$

and substitutes the $l_i'(z)$ in the corresponding part of the table as illustrated in FIG. 19 for example.

Further, the conditional expected value calculating unit 27 similarly calculates a second derivative l''(z) of a conditional expected value l(z) of a portfolio value V and a second derivative $l_i''(z)$ of a conditional expected value $l_i(z)$ of the portfolio value V of each obligor using $$l_i''(z) = \sum_r w_{ir} ps''_{ir}(z)$$

$$l''(z) = \frac{d^2}{dz^2} E[V \mid z] = \sum_i l_i''(z)$$

and substitutes the $l_i''(z)$ in the corresponding part of the table as illustrated in FIG. 19 for example.

In step S51, the conditional variance calculating unit 28 calculates a conditional variance v(z) of a portfolio value V and a partial distribution $v_i(z)$ of each obligor of v(z) based on the difference $w_{ir}$ in value between adjacent ratings of a obligor i as illustrated in FIG. 18 calculated in the processing of FIG. 24, and the probability $ps_{ir}(z)$ that the rating of the obligor i becomes the rating r or lower under the condition that the risk factor z is fixed as illustrated in FIG. 14 calculated in the processing of FIG. 23 using $$v_i(z) = V_i \frac{\partial}{\partial V_i} \mathrm{Var}[V \mid z]$$

$$v(z) = \frac{1}{2} \sum_i v_i(z)$$

and substitutes the $v_i(z)$ in the corresponding part of the table as illustrated in FIG. 19 for example.

Further, the conditional variance calculating unit 28 similarly calculates a first derivative v'(z) of a conditional variance v(z) of a portfolio value V and a partial distribution $v_i'(z)$ of each obligor of v'(z) using $$v_i'(z) = V_i \frac{\partial}{\partial V_i} \cdot \frac{d}{dz} \mathrm{Var}[V \mid z]$$

$$v'(z) = \frac{1}{2} \sum_i v_i'(z)$$

and substitutes the $v_i'(z)$ in the corresponding part of the table as illustrated in FIG. 19 for example.

Here, the order of the processing of step S50 and the processing of step S51 is not in question. Step S51 may be earlier than step S50, or may be later than step S50. Further, they may be performed simultaneously.

In step S52, the $q\alpha$ calculating unit 29 calculates a percentile $q\alpha$ or the like of a portfolio value according to the confidence level $\alpha$ based on the conditional expected value $l_i(z)$, the first derivative $l_i'(z)$, and the second derivative $l_i''(z)$ of a portfolio value V of each obligor calculated in step S50 and stored in the table as illustrated in FIG. 19, and the $v_i(z)$ and the first derivative $v_i'(z)$ calculated in step S51 and stored in the table as illustrated in FIG. 19 using $$\Delta q_{\alpha i}(z) = V_i \frac{\partial}{\partial V_i} \left\{ -\frac{1}{2l'(z)} \left( v'(z) - v(z)\left(\frac{l''(z)}{l'(z)} + z\right) \right) \right\}$$

$$\Delta q_\alpha(z) = \sum_i \Delta q_{\alpha i}$$

$$q_{\alpha i} = (l_i(z) + \Delta q_{\alpha i}(z))\big|_{z=N^{-1}(1-\alpha)}$$

$$q_\alpha = \sum_i q_{\alpha i}$$

and substitutes the calculated $q\alpha_i$ or $\Delta a\alpha_i(z)$ in the corresponding part of the table as illustrated in FIG. 19.

Figure 26:
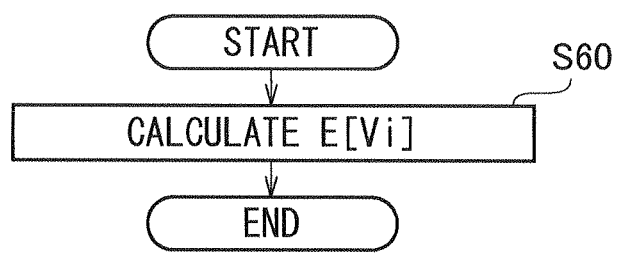
FIG. 26 is a flowchart illustrating an example of processing to calculate an expected value $E[V_i]$ of an exposure value of a obligor i.

FIG. 26 is a flowchart illustrating an example of processing to calculate the expected value $E[V_i]$ of the exposure value of a obligor i.

In step S60, the $E[V_i]$ calculating unit 30 obtains a rating transition matrix (probability $p_{sr}$ of transition from the current rating s to the rating r) illustrated in FIG. 8 as a parameter from the RAM 16 or the like for example and obtains an exposure value $V_{ir}$ of a obligor i when transition from the current rating to the rating r occurs as illustrated in FIG. 17 as a parameter from the RAM 16 or the like for example, and calculates an expected value $E[V_i]$ of an exposure value of a obligor i based on the obtained probability $p_{sr}$ of transition from the current rating to the rating r and the obtained current rating of the obligor i and exposure value $V_{ir}$ when transition to the rating r occurs using $$E[V_i] = \sum_r p_{ir} V_{ir}$$

and substitutes the calculated $E[V_i]$ in the corresponding position of a table as illustrated in FIG. 20.

Figure 27:
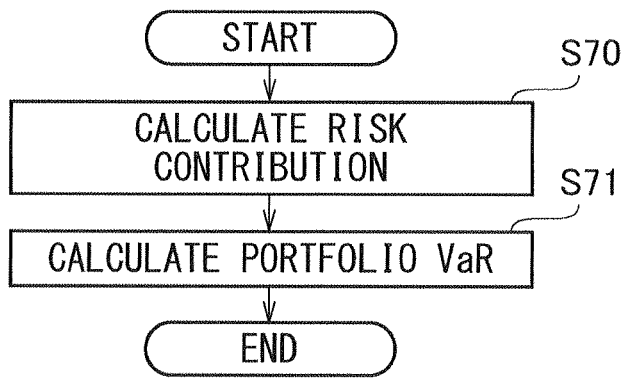
FIG. 27 is a flowchart illustrating an example of processing to calculate an individual company risk contribution and a portfolio VaR.

FIG. 27 is a flowchart illustrating an example of processing to calculate the individual company risk contribution and the portfolio VaR.

In step S70, the risk contribution calculating unit 31 calculates a risk contribution (individual company risk contribution) of a obligor i based on the $E[V_i]$ calculated in the processing of FIG. 26 and stored in the table as illustrated in FIG. 20 and the $q\alpha_i$ calculated in the processing of FIG. 25 and stored in the table as illustrated in FIG. 19 using $$\text{risk contribution of a obligor } i = q\alpha_i - E[V_i]$$

for example and substitutes the calculated risk contribution of the obligor i in the corresponding part of the table as illustrated in FIG. 20.

In step S71, the portfolio VaR calculating unit 32 calculates a portfolio VaR based on the risk contribution of a obligor i calculated in step S70 and stored in the table as illustrated in FIG. 20 using $$\text{Portfolio } VaR = q\alpha - \sum_i E[V_i] = \sum_i \text{risk contribution of an obligor } i$$

for example and substitutes the calculated risk contribution of the obligor i in the corresponding part of the table as illustrated in FIG. 20.

As described above, the information processing apparatus of this embodiment has a technical characteristic in that it calculates analytical approximation of VaR of the portfolio value V in the MTM method using the difference $w_{ir}$ in exposure value between adjacent ratings. Hereinafter, this point will be described in more detail.

First, calculation of VaR by the Monte Carlo method in each of the DM method and the MTM method will be described.

Expressions for performing a simulation by the Monte Carlo method in the DM method are shown below.

$$\theta_i = N^{-1}(p_i) \quad \text{Expression (5)}$$

$$D_i = 1_{\{x_i < \theta_i\}}$$

$$1_{\{b\}} = \begin{cases} 1 & \text{when } b \text{ is true} \\ 0 & \text{when } b \text{ is false} \end{cases}$$

$$L_i = D_i LGD_i EAD_i$$

$$L = \sum_i L_i$$

Here,
L is a loss of the portfolio,
$L_i$ is a loss by the obligor i,
$D_i$ is a random variable indicating the status of the obligor i (default or non-default),
$x_i$ is a random variable indicating the enterprise value of the obligor i,
$1[\bullet]$ is a defined function,
$x_i < \theta_i$ is whether the enterprise value $x_i$ of a obligor i becomes lower than the default threshold $\theta_i$ or not
$LGD_i$ is a loss given default in exposure of the obligor i, and
$EAD_i$ is an amount of exposure of the obligor i,
$p_i$ is a default rate of the obligor i
$N(\bullet)$ is a cumulative probability function of a standard normal distribution, and
$N^{-1}(\bullet)$ is an inverse function of $N(\bullet)$.

Expressions for performing a simulation by the Monte Carlo method in the MTM method are shown below.

$$ps_{ir} = \sum_{k=1}^{r} p_{ik} \quad \text{Expression (6)}$$

$$\theta_{ir} = N^{-1}(ps_{ir})$$

$$S_{ir} = 1_{\{R_i = r\}} = 1_{\{\theta_{i(r-1)} \le x_i < \theta_{ir}\}}$$

$$V_i = \sum_r S_{ir} V_{ir}$$

$$V = \sum_i V_i$$

Here,
V is the value of a portfolio,
$V_i$ is a value of exposure after rating transition of a obligor i
$V_{ir}$ is a value of exposure when the obligor i has a rating r,
$R_i$ is the rating of the obligor i after rating transition,
$S_{ir}$ is a random variable indicating the status of the obligor i (whether Ri is r or not),
$x_i$ is a random variable indicating the enterprise value of the obligor i,
$p_{ik}$ is a probability of transition of the obligor to a rating k,
$ps_{ir}$ is a probability of transition of the obligor to a rating r,
$N(\bullet)$ is a cumulative probability function of a standard normal distribution, and
$N^{-1}(\bullet)$ is an inverse function of $N(\bullet)$.

Note that the smaller the r is, the lower the rating it denotes in the above-described expressions.

As shown in Expression (5), in the DM method, the information processing apparatus generates random numbers corresponding to the random variable $x_i$ for the number of times of trials and calculates in the order of $D_i \rightarrow L_i \rightarrow L$, to thereby calculate a probability distribution and a risk indicator (namely, VaR) thereof. Further, as shown in Expression (6), in the MTM method, the information processing apparatus generates random numbers corresponding to the random variable $x_i$ for the number of times of trials and calculates in the order of $S_{ir} \to V_i \to V$, to thereby calculate a probability distribution and a risk indicator (namely, VaR) thereof.

Next, analytical approximation of VaR will be described. For example, the IMES Discussion Paper discloses an approach of analytical approximation of VaR in the DM method. The IMES Discussion Paper describes approximation of a quantile $q\alpha(L)$ of a loss ratio distribution L with $q\alpha(E[L|Z]) + \Delta q\alpha(L)$. Incidentally, the IMES Discussion Paper describes as theory 2 that an $\alpha$ quantile $q\alpha(E[L|Z])$ of a limiting loss distribution $E[L|Z]$ is calculated by a conditional expected loss given a 1–$\alpha$ quantile of Z. Further, the IMES Discussion Paper describes as theory 3 a granularity adjustment term which is a difference $\Delta q\alpha(L)$ ($=q\alpha(L)-q\alpha(E[L|Z])$) between a true loss quantile and an $\alpha$ quantile of a limiting loss distribution. Then the IMES Discussion Paper describes that this granularity adjustment term $\Delta q\alpha(L)$ is represented as the following expression. Here, $l(z)=E[L|Z=z]$, $v(z)=VaR[L|Z=z]$.

$$\Delta q_\alpha(L) = -\frac{1}{2l'(z)}\left(v'(z) - v(z)\left(\frac{l''(z)}{l'(z)} + z\right)\right)\bigg|_{z=N^{-1}(1-\alpha)}$$

Then the IMES Discussion Paper describes that a VaR is calculated as the quantile $q\alpha(L)$ of the loss ratio distribution L by calculating the above expression.

Incidentally, in the Monte Carlo method, the information processing apparatus uses $$V_i = \sum_r S_{ir} V_{ir}$$

in the MTM method corresponding to the calculation of $L_i = D_i LGD_i EAD_i$ of the DM method as shown in Expression (6). Accordingly, the information processing apparatus calculates the above-described granularity adjustment term using this expression in the analytical approximation of the MTM method.

Here, $l(z)=E[V|z]$, $v(z)=VaR[V|z]$. This calculation of VaR [V|z] is represented more specifically as the following expression.

$$\text{Var}[V|z] = \sum_i \sum_j \text{Cov}[V_i, V_j | z]$$
$$= \sum_i \sum_j \sum_r \sum_s \text{Corr}[S_{ir}V_{ir}, S_{js}V_{js} | z]$$
$$\sqrt{\text{Var}[S_{ir}V_{ir}|z] \cdot \text{Var}[S_{js}V_{js}|z]}$$

Here, the amount of calculation of the part Corr, $[S_{ir}V_{ir}, S_{js}V_{js}|z]$ is proportional to the "square of (the number of obligors×the number of ratings)". For example, when the number of obligors=10000 and the number of ratings=10, the calculation of correlation is needed to be performed the number of times equal to the square of (10000×10), that is, the tenth power of 10.

On the other hand, the information processing apparatus according to this embodiment calculates the $\alpha$ quantile $q\alpha$ of a portfolio value V using the difference $w_{ir}$ in exposure value between adjacent ratings. At this time, the information processing apparatus calculates $E[V|z]$ in Expression (3) or the like and $VaR[V|z]$ in Expression (4) or the like for calculating $\Delta q\alpha$, but also in this calculation, the amount of calculation in proportion to "the square of (the number of obligors×the number of ratings)" is needed. However, as described using FIG. 15, FIG. 16, and the like of this embodiment, the information processing apparatus calculates $N^{-1}(ps_{ir}(z))$ and the like besides $w_{ir}$, $ps_{ir}(z)$, and $ps'_{ir}(z)$ for "the number of obligors×the number of ratings", and stores the calculated values of correlations $\rho_{ij}$ for the amount of "the square of the number of obligors" as parameters in a storage device such as a memory or a cache. In this point, the information processing apparatus can read and reuse data of parameters from the storage device such as a memory when executing calculation of the amount in proportion to "the square of (the number of obligors×the number of ratings)" requiring these parameters. Accordingly, calculation efficiency increases significantly. Further, the information processing apparatus keeps frequently used data stored in a cache having much higher reading and writing speed than that of the memory. Thus, when these parameters are stored in the cache and the operation is increased in speed particularly using a function called SIMD (Single Instruction Multiple Data) of the CPU or the like, it is possible to prevent the reading speed of the memory from becoming a bottle neck, and reduce the idling time of the CPU or the like. That is, when the analytical approximation of VaR in the MTM method is obtained, the difference $w_{ir}$ in exposure value between adjacent ratings can be used to increase calculation efficiency, and thus the VaR in the MTM method can be calculated rapidly.

Incidentally, $v_i(z)$ and $vi'(z)$ are represented by the following expressions.

$$v_i(z) = v_{\infty i}(z) + v_{Gi}(z) \qquad \text{Expression (7)}$$
$$v'_i(z) = v'_{\infty i}(z) + v'_{Gi}(z)$$

Here, $v_{\infty i}$ and $v'_{\infty i}$ are represented by the following expressions.

$$v_{\infty i}(z) = \qquad \text{Expression (8)}$$
$$2\sum_j \sum_r \sum_s w_{ir} w_{js}(N_2(N^{-1}(ps_{ir}(z)), N^{-1}(ps_{js}(z)), \rho_{ij}) - ps_{ir}(z)ps_{js}(z))$$

$$v'_{\infty i}(z) = 2\sum_j \sum_r \sum_s w_{ir} w_{js} ps'_{ir}(z)$$
$$\left(N\left(\frac{N^{-1}(ps_{js}(z)) - \rho_{ij} N^{-1}(ps_{ir}(z))}{\sqrt{1-(\rho_{ij})^2}}\right) - ps_{js}(z)\right) +$$
$$2\sum_j \sum_r \sum_s w_{ir} w_{js} ps'_{js}(z)$$
$$\left(N\left(\frac{N^{-1}(ps_{ir}(z)) - \rho_{ij} N^{-1}(ps_{js}(z))}{\sqrt{1-(\rho_{ij})^2}}\right) - ps_{ir}(z)\right)$$

Further, $v_{Gi}$ and $v'_{Gi}$ are represented by the following expressions.

$$v_{Gi}(z) = 2\sum_r \sum_s w_{ir}$$  Expression (9)

$$w_{is}(ps_{ir}(z) - N_2(N^{-1}(ps_{ir}(z)), N^{-1}(ps_{is}(z)), \rho_{ii}))$$

$$v'_{Gi}(z) = 2\sum_r \sum_s w_{ir} w_{is} \left( ps'_{it}(z) - 2ps'_{ir}(z) N\left( \frac{N^{-1}(ps_{is}(z)) - \rho_{ii} N^{-1}(ps_{ir}(z))}{\sqrt{1-(\rho_{ii})^2}} \right) \right)$$

Parts of $N_2(x, y, \rho)$ in Expression (8) and Expression (9) are cumulative probability functions of a bivariate standard normal distribution. Further, $t=\min(r, s)$ (one with a lower rating out of r and s). Further, $\rho_{ij}=\text{corr}(x_i, x_j|z)$ (the part $\epsilon_i$ corresponding to the idiosyncratic risk of a obligor in $x_i$ is calculated as $\text{corr}(\epsilon_i, \epsilon_j)=0$).

Moreover, $\Delta a \alpha_i(z)$ is represented by, more specifically, the following expression.

$$\Delta q_{ai}(z) = V_i \frac{\partial}{\partial V_i} \Delta q_a(z) = \frac{l'_i(z)}{2(l'(z))^2} v'(z) - \frac{1}{2l'(z)} v'_i(z) - \frac{l'_i(z)}{2(l'(z))^2} v(z)z + \frac{1}{2l'(z)} v_i(z)z - \frac{l'_i(z)}{(l'(z))^3} v(z) l''(z) + \frac{1}{2(l'(z))^2} v_i(z) l''(z) + \frac{1}{2(l'(z))^2} v(z) l''_i(z)$$  Expression (10)

With the above-described structure, the information processing apparatus according to this embodiment uses the difference $w_{ir}$ in exposure value between adjacent ratings so as to store $N^{-1}(ps_{ir}(z))$, $\rho ij$, and the like besides $w_{ir}$, $ps_{ir}(z)$, and $ps'_{ir}(z)$ as parameters in the cache, which can be reused repeatedly when performing the calculation of Expression (7) to Expression (10). Thus the calculation efficiency can be increased. Accordingly, the analytical approximation of VaR in the MTM method can be calculated rapidly.

As has been described above, according to this embodiment, it becomes possible to quickly calculate the conditional expected value l(z) and the variance v(z) of a portfolio value needed for calculating granularity adjustment, and the derivatives of them for polynomial distributions in the MTM method. Further consequently, the portfolio VaR (percentile $q\alpha$ according to the confidence level $\alpha$) and risk contributions of individual companies can be calculated rapidly.

In short, according to this embodiment, a polynomial distribution representing rating transitions and profits and losses of a obligor i in the MTM method can be expressed by addition of binomial distributions, and thereby VaR and the like can be obtained quickly by analytical approximation even in the MTM method.

Note that the processing of this embodiment can be applied to calculation of a risk indicator similar to VaR, such as an expected shortfall, or the like.

Further, the above-described $l_i(z)$, $l_i'(z)$, $l_i''(z)$, $v_i(z)$, $v_i'(z)$, and $q\alpha_i$ are repeating of the same calculation pattern for each obligor. Accordingly, the conditional expected value calculating unit 27, the conditional variance calculating unit 28, the $q\alpha$ calculating unit 29, and the like can use the function called SIMD (Single Instruction Multiple Data) mounted in the CPU 17 or the like (hereinafter referred to as a SIMD function) to calculate the $l_i(z)$, $l_i'(z)$, $l_i''(z)$, $v_i(z)$, $v_i'(z)$, and $q\alpha_i$ rapidly.

In the foregoing, the preferred embodiment of the present invention has been described in detail, but the present invention is not limited to such a specific embodiment, and can be modified and changed in various ways within the scope of the spirit of the invention described in the claims that follow.

According to the present invention, it is possible to allow obtaining VaR and the like quickly in analytical approximation in an MTM method.

The present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

The invention claimed is:

1. An information processing apparatus, comprising:
a computer processor;
a z calculating unit configured to calculate, via the computer processor, based on a confidence level $\alpha$ stored in a storage device, a percentile of a risk factor z corresponding to $\alpha$ using $$z=N^{-1}(1-\alpha);$$

a rating threshold calculating unit configured to obtain, via the processor, a probability $p_{sk}$ of transition from a rating s to a rating k stored in the storage device, wherein the rating threshold calculating unit is further configured to calculate a rating threshold $\theta_{ir}$ at which the rating of a obligor i becomes a rating r or lower based on the obtained $p_{sk}$;

a conditional probability calculating unit configured to obtain, via the computer processor, a constant $a_i$ of each obligor i stored in the storage device, wherein the conditional probability calculating unit is further configured to calculate a probability $ps_{ir}(z)$ that the rating of the obligor i becomes the rating r or lower under a condition that z is fixed based on the obtained $a_i$, z calculated in the z calculating unit, and the $\theta_{ir}$ calculated in the rating threshold calculating unit using $$ps_{ir}(z) = N\left( \frac{\theta_{ir} - \sqrt{a_i}\, z}{\sqrt{1-a_i}} \right)$$

where N is a cumulative probability function of a standard normal distribution;

a $w_{ir}$ calculating unit configured to calculate, via the computer processor, a difference $w_{ir}$ in exposure value between adjacent ratings of the obligor i based on an exposure value $V_{ir}$ of the obligor i when transition from a current rating to the rating r occurs, which is stored in the storage device, using $w_{ir}=V_{ir}-V_{i(r+1)}$;

a conditional expected value calculating unit configured to calculate, via the computer processor, a conditional expected value l(z) of a portfolio value V under a condition that z is fixed based on $w_{ir}$ calculated in the $w_{ir}$ calculating unit and $ps_{ir}(z)$ calculated in the conditional probability calculating unit using $$l_i(z) = \sum_r w_{ir} ps_{ir}(z)$$

$$l(z) = E[V|z] = \sum_i l_i(z);$$

a conditional variance calculating unit configured to calculate, via the computer processor, a conditional variance v(z) of the portfolio value V under a condition that z is fixed based on $w_{ir}$ calculated in the $w_{ir}$ calculating unit and $ps_{ir}(z)$ calculated in the conditional probability calculating unit using $$v_i(z) = V_i \frac{\partial}{\partial V_i} \operatorname{Var}[V \mid z]$$

$$v(z) = \frac{1}{2} \sum_i v_i(z);$$

a qα calculating unit configured to calculate, via the computer processor, a percentile qα of a portfolio value based on a first derivative $l'(z)$ of $l(z)$ calculated in the conditional expected value calculating unit, a second derivative $l''(z)$ of $l(z)$ calculated in the conditional expected value calculating unit, $v(z)$ calculated in the conditional variance calculating unit, and a first derivative $v'(z)$ of $v(z)$ calculated in the conditional variance calculating unit using $$\Delta q_{\alpha i}(z) = V_i \frac{\partial}{\partial V_i} \left\{ -\frac{1}{2l'(z)} \left( v'(z) - v(z) \left( \frac{l''(z)}{l'(z)} + z \right) \right) \right\}$$

$$\Delta q_\alpha(z) = \sum_i \Delta q_{\alpha i}$$

$$q_{\alpha i} = (l_i(z) + \Delta q_{\alpha i}(z)) \big|_{z=N^{-1}(1-\alpha)}$$

$$q_\alpha = \sum_i q_{\alpha i};$$

an $E[V_i]$ calculating unit configured to obtain, via the computer processor, an exposure value $V_{ir}$ of the obligor i when transition from a current rating to the rating r occurs, wherein the $E[V_i]$ calculating unit is further configured to obtain a probability $p_{ir}$ of transition from a rating i to the rating r stored in the storage device, and wherein the $E[V_i]$ calculating unit is further configured to calculate an expected value $E[V_i]$ of an exposure value of the obligor i based on the obtained $V_{ir}$ and probability $p_{ir}$ using $$E[V_i] = \sum_r p_{ir} V_{ir}; \text{ and}$$

a portfolio VaR calculating unit configured to calculate, via the computer processor, a portfolio VaR from the percentile $q_{\alpha i}$ and the expected value $E[V_i]$ of the exposure value of the obligor I,
wherein the rating threshold calculating unit includes:
a $ps_{sr}$ calculating unit configured to calculate, via the computer processor, a probability $ps_{sr}$ of transition from the rating s to the rating r or lower based on the probability $p_{sk}$, using $$ps_{sr} = \sum_{k=1}^{r} p_{sk}$$

a $ps_{ir}$ calculating unit configured to obtain, via the computer processor, a probability psi, of transition of the obligor i to the rating r or lower based on the probability $ps_{sr}$ calculated in the $ps_{sr}$ calculating unit; and a $\theta_{ir}$ calculating unit configured to calculate, via the computer processor, the rating threshold $\theta_{ir}$ at which the rating of the obligor i becomes the rating r or lower based on the probability $ps_{ir}$ obtained in the $ps_{ir}$ calculating unit using $\theta_{ir} = N^{-1}(ps_{ir})$.

2. The information processing apparatus according to claim 1, wherein the portfolio VaR calculating unit is configured to calculate, via the computer processor, a portfolio VaR based on $E[V_i]$ calculated in the $E[V_i]$ calculating unit and qα calculated in the qα calculating unit using $$\text{Portfolio } VaR = q\alpha - \sum_i E[V_i].$$

3. The information processing apparatus according to claim 1, further comprising:
a risk contribution calculating unit configured to calculate, via the computer processor, a risk contribution of a obligor i based on $E[V_i]$ calculated in the $E[V_i]$ calculating unit and $q\alpha_i$ calculated when calculating qα in the qα calculating unit using risk contribution of a obligor $i = q\alpha_i - E[V_i]$.

4. The information processing apparatus according to claim 3, further comprising:
a portfolio VaR calculating unit configured to calculate, via the computer processor, a portfolio VaR based on the risk contribution of the obligor i calculated in the risk contribution calculating unit using Portfolio $VaR = \Sigma$risk contribution of an obligor $i$.

5. The information processing apparatus according to claim 1,
wherein the conditional expected value calculating unit is configured to calculate the conditional expected value $l(z)$ of the portfolio value V using a SIMD function provided by a CPU,
wherein the conditional variance calculating unit is configured to calculate the conditional variance $v(z)$ of the portfolio V using the SIMD function provided by the CPU, and
wherein the qα calculating unit is configured to calculate $q\alpha_i$ using the SIMD function provided by the CPU.

6. An information processing method executed by an information processing apparatus, the method comprising:
a z calculating step of calculating via a computing device, based on a confidence level α stored in a storage device, a percentile of a risk factor z corresponding to a using $$z = N^{-1}(1-\alpha);$$

a rating threshold calculating step of obtaining via the computing device a probability $p_{sk}$ of transition from a rating s to a rating k stored in the storage device, and calculating via the computing device a rating threshold $\theta_{ir}$ at which the rating of a obligor i becomes a rating r or lower based on the obtained $p_{sk}$;
a conditional probability calculating step of obtaining a constant $a_i$ of each obligor stored in the storage device, and calculating via the computing device a probability $ps_{ir}(z)$ that the rating of the obligor i becomes the rating r or lower under a condition that z is fixed based on the obtained $a_i$, z calculated in the z calculating step, and the $\theta_{ir}$ calculated in the rating threshold calculating step using $$ps_{ir}(z) = N\left(\frac{\theta_{ir} - \sqrt{a_i}\, z}{\sqrt{1-a_i}}\right)$$

where N is a cumulative probability function of a standard normal distribution;
a $w_{ir}$ calculating step of calculating via the computing device a difference $w_{ir}$ in exposure value between adjacent ratings of the obligor i based on an exposure value $V_{ir}$ of the obligor i when transition from a current rating to the rating r occurs, which is stored in the storage device, using $w_{ir}=V_{ir}-V_{i(r+1)}$;
a conditional expected value calculating step of calculating, via the computing device, a conditional expected value 1(z) of a portfolio value V under a condition that z is fixed based on $w_{ir}$ calculated in the $w_{ir}$ calculating step and $ps_{ir}(z)$ calculated in the conditional probability calculating step using $$l_i(z) = \sum_r w_{ir} ps_{ir}(z)$$

$$l(z) = E[V \mid z] = \sum_i l_i(z);$$

a conditional variance calculating step of calculating, via the computing device, a conditional variance v(z) of the portfolio value V under a condition that z is fixed based on $w_{ir}$ calculated in the $w_{ir}$ calculating step and $ps_{ir}(z)$ calculated in the conditional probability calculating step using $$v_i(z) = V_i \frac{\partial}{\partial V_i} \text{Var}[V \mid z]$$

$$v(z) = \frac{1}{2}\sum_i v_i(z);$$

a qα calculating step of calculating, via the computing device, a percentile qα of a portfolio value based on a first derivative 1'(z) of 1(z) calculated in the conditional expected value calculating step, a second derivative 1''(z) of 1(z) calculated in the conditional expected value calculating step, v(z) calculated in the conditional variance calculating step, and a first derivative v'(z) of v(z) calculated in the conditional variance calculating step using $$\Delta q_{\alpha i}(z) = V_i \frac{\partial}{\partial V_i}\left\{-\frac{1}{2l'(z)}\left(v'(z) - v(z)\left(\frac{l''(z)}{l'(z)} + z\right)\right)\right\}$$

$$\Delta q_\alpha(z) = \sum_i \Delta q_{\alpha i}$$

$$q_{\alpha i} = (l_i(z) + \Delta q_{\alpha i}(z))\big|_{z=N^{-1}(1-\alpha)}$$

$$q_\alpha = \sum_i q_{\alpha i};$$

an $E[V_i]$ calculating step of obtaining, via the computing device, an exposure value Vir of the obligor i when transition from a current rating to the rating r occurs, which is stored in the storage device, and obtaining a probability $p_{ir}$ of transition from a rating i to the rating r stored in the storage device, and calculating an expected value $E[V_i]$ of an exposure value of the obligor i based on the obtained $V_{ir}$ and probability $p_{ir}$ using $$E[V_i] = \sum_r p_{ir} V_{ir}; \text{ and}$$

a portfolio VaR calculating step of calculating, via the computing device, a portfolio VaR from the percentile $q_{\alpha i}$ and the expected value $E[V_i]$ of the exposure value of the obligor I,
wherein the rating threshold calculating unit includes:
a $ps_{sr}$ calculating step of calculating, via the computing device, a probability $ps_{sr}$ of transition from the rating s to the rating r or lower based on the probability $p_{sk}$, using $$ps_{sr} = \sum_{k=1}^{r} p_{sk}$$

a $ps_{ir}$ calculating step of obtaining, via the computing device, a probability psi, of transition of the obligor i to the rating r or lower based on the probability $ps_{sr}$ calculated in the $ps_{sr}$ calculating step; and
a $\theta_{ir}$ calculating step of calculating, via the computing device, the rating threshold $\theta_{ir}$ at which the rating of the obligor i becomes the rating r or lower based on the probability $ps_{ir}$ obtained in the $ps_{ir}$ calculating step using $\theta_{ir}=N^{-1}(ps_{ir})$.

7. A program product comprising a non-transitory computer usable medium having control logic stored thereon for causing a computer to function as:
a z calculating unit calculating, based on a confidence level α stored in a storage device, a percentile of a risk factor z corresponding to a using $z=N^{-1}(1-\alpha)$;
a rating threshold calculating unit obtaining a probability $p_{sk}$ of transition from a rating s to a rating k stored in the storage device, and calculating a rating threshold $\theta_{ir}$ at which the rating of a obligor i becomes a rating r or lower based on the obtained $p_{sk}$;
a conditional probability calculating unit obtaining a constant $a_i$ of each obligor i stored in the storage device, and calculating a probability $ps_{ir}(z)$ that the rating of the obligor i becomes the rating r or lower under a condition that z is fixed based on the obtained $a_i$, z calculated in the z calculating unit, and the $\theta_{ir}$ calculated in the rating threshold calculating unit using $$ps_{ir}(z) = N\left(\frac{\theta_{ir} - \sqrt{a_i}\, z}{\sqrt{1-a_i}}\right)$$

where N is a cumulative probability function of a standard normal distribution;
a $w_{ir}$ calculating unit calculating a difference $w_{ir}$ in exposure value between adjacent ratings of the obligor i based on an exposure value $V_{ir}$ of the obligor i when transition from a current rating to the rating r occurs, which is stored in the storage device, using $w_{ir}=V_{ir}-V_{i(r+i)}$;
a conditional expected value calculating unit calculating a conditional expected value 1(z) of a portfolio value V under a condition that z is fixed based on $w_{ir}$ calculated in the $w_{ir}$ calculating unit and $ps_{ir}(z)$ calculated in the conditional probability calculating unit using $$l_i(z) = \sum_r w_{ir} ps_{ir}(z)$$

$$l(z) = E[V|z] = \sum_i l_i(z);$$

a conditional variance calculating unit calculating a conditional variance $v(z)$ of the portfolio value V under a condition that z is fixed based on $w_{ir}$ calculated in the $w_{ir}$ calculating unit and $ps_{ir}(z)$ calculated in the conditional probability calculating unit using $$v_i(z) = V_i \frac{\partial}{\partial V_i} \mathrm{Var}[V|z]$$

$$v(z) = \frac{1}{2} \sum_i v_i(z);$$

a $q\alpha$ calculating unit calculating a percentile $q\alpha$ of a portfolio value based on a first derivative $l'(z)$ of $l(z)$ calculated in the conditional expected value calculating unit, a second derivative $l''(z)$ of $l(z)$ calculated in the conditional expected value calculating unit, $v(z)$ calculated in the conditional variance calculating unit, and a first derivative $v'(z)$ of $v(z)$ calculated in the conditional variance calculating unit using $$\Delta q_{\alpha i}(z) = V_i \frac{\partial}{\partial V_i} \left\{ -\frac{1}{2l'(z)} \left( v'(z) - v(z) \left( \frac{l''(z)}{l'(z)} + z \right) \right) \right\}$$

$$\Delta q_\alpha(z) = \sum_i \Delta q_{\alpha i}$$

$$q_{\alpha i} = (l_i(z) + \Delta q_{\alpha i}(z))|_{z=N^{-1}(1-\alpha)}$$

$$q_\alpha = \sum_i q_{\alpha i};$$

an $E[V_i]$ calculating unit obtaining an exposure value $V_{ir}$ of the obligor i when transition from a current rating to the rating r occurs, which is stored in the storage device, and obtaining a probability $p_{ir}$ of transition from a rating i to the rating r stored in the storage device, and calculating an expected value $E[V_i]$ of an exposure value of the obligor i based on the obtained $V_{ir}$ and probability $p_{ir}$ using $$E[V_i] = \sum_r p_{ir} V_{ir}; \text{ and}$$

a portfolio VaR calculating unit calculating a portfolio VaR from the percentile $q_{\alpha i}$ and the expected value $E[V_i]$ of the exposure value of the obligor I, wherein the rating threshold calculating unit includes:

a $ps_{sr}$ calculating unit calculating a probability $ps_{sr}$ of transition from the rating s to the rating r or lower based on the probability $p_{sk}$, using $$ps_{sr} = \sum_{k=1}^r p_{sk}$$

a $ps_{ir}$ calculating unit obtaining a probability psi, of transition of the obligor i to the rating r or lower based on the probability $ps_{sr}$ calculated in the $ps_{sr}$ calculating unit; and a $\theta_{ir}$ calculating unit calculating the rating threshold $\theta_{ir}$ at which the rating of the obligor i becomes the rating r or lower based on the probability $ps_{ir}$ obtained in the $ps_{ir}$ calculating unit using $\theta_{ir} = N^{-1}(ps_{ir})$.

* * * * *